(12) United States Patent
Takeuchi et al.

(10) Patent No.: US 12,625,326 B2
(45) Date of Patent: May 12, 2026

(54) INTELLIGENT OPTICAL SWITCH

(71) Applicant: Go!Foton Holdings, Inc., Somerset, NJ (US)

(72) Inventors: Kenichiro Takeuchi, North Brunswick, NJ (US); David Zhi Chen, Dallas, TX (US); Haiguang Lu, Los Altos, CA (US)

(73) Assignee: Go!Foton Holdings, Inc., Somerset, NJ (US)

(*) Notice: Subject to any disclaimer, the term of this patent is extended or adjusted under 35 U.S.C. 154(b) by 41 days.

(21) Appl. No.: 18/748,676

(22) Filed: Jun. 20, 2024

(65) Prior Publication Data

US 2024/0337792 A1 Oct. 10, 2024

Related U.S. Application Data

(63) Continuation of application No. 17/366,551, filed on Jul. 2, 2021, now Pat. No. 12,055,762.

(Continued)

(51) Int. Cl.
| | |
|---|---|
| *G02B 6/35* | (2006.01) |
| *G02B 6/44* | (2006.01) |

(52) U.S. Cl.
CPC ......... *G02B 6/3504* (2013.01); *G02B 6/3508* (2013.01); *G02B 6/3546* (2013.01); *G02B 6/44524* (2023.05); *G02B 6/44528* (2023.05)

(58) Field of Classification Search
CPC .. G02B 6/3504; G02B 6/3508; G02B 6/3546; G02B 6/44524; G02B 6/3548;

(Continued)

(56) References Cited

U.S. PATENT DOCUMENTS

| | | | |
|---|---|---|---|
| 2,865,979 A | 12/1958 | Klassen | |
| 4,088,387 A | 5/1978 | Lewis | |

(Continued)

FOREIGN PATENT DOCUMENTS

| | | | |
|---|---|---|---|
| CA | 2090363 C | 11/1998 | |
| CN | 1054854 A | 9/1991 | |

(Continued)

OTHER PUBLICATIONS

Partial International Search Report for Application No. PCT/US2013/033701 dated Jul. 11, 2013.

(Continued)

*Primary Examiner* — Andrew Jordan
(74) *Attorney, Agent, or Firm* — Lerner David LLP

(57) ABSTRACT

An optical assembly includes a connector assembly, a plurality of port assemblies, and a frame assembly. The connector assembly includes an optical fiber connector. The plurality of port assemblies is fixed in position relative to each other. The frame assembly includes a frame directly attached to the connector assembly or directly attached to the plurality of port assemblies. The frame is moveable to align the connector with each of the port assemblies. The connector is insertable into each of the port assemblies when the connector is aligned with a respective one of the port assemblies by moving the connector or the respective port assembly aligned with the connector along a single axis and into the respective port assembly.

15 Claims, 8 Drawing Sheets

Related U.S. Application Data

(60) Provisional application No. 63/047,522, filed on Jul. 2, 2020.

(58) Field of Classification Search
CPC .. G02B 6/3556; G02B 6/3574; G02B 6/4215; G02B 6/44528; G02B 6/3514; G01M 11/3154
See application file for complete search history.

(56) References Cited

U.S. PATENT DOCUMENTS

| | | | |
|---|---|---|---|
| 4,353,518 A | 10/1982 | Taylor et al. | |
| 4,688,885 A | 8/1987 | Poteat et al. | |
| 4,886,335 A * | 12/1989 | Yanagawa | H04Q 11/0003 |
| | | | 250/227.21 |
| 5,100,221 A | 3/1992 | Carney et al. | |
| 5,114,356 A | 5/1992 | Taybl et al. | |
| 5,137,351 A * | 8/1992 | So | G01M 11/3154 |
| | | | 356/73.1 |
| 5,359,683 A * | 10/1994 | Pan | G02B 6/32 |
| | | | 385/33 |
| 5,386,485 A | 1/1995 | Saito et al. | |
| 5,420,946 A | 5/1995 | Tsai | |
| 5,479,541 A * | 12/1995 | Pan | G02B 6/3582 |
| | | | 385/33 |
| 5,504,825 A | 4/1996 | Saito et al. | |
| 5,611,009 A * | 3/1997 | Pan | G02B 6/3524 |
| | | | 385/38 |
| 5,613,021 A | 3/1997 | Saito et al. | |
| 5,775,755 A | 7/1998 | Covert et al. | |
| 5,815,614 A * | 9/1998 | Pan | G02B 6/3526 |
| | | | 385/38 |
| 5,920,667 A | 7/1999 | Tiao et al. | |
| 6,009,219 A | 12/1999 | Doyle | |
| 6,070,742 A | 6/2000 | McAnally et al. | |
| 6,263,141 B1 | 7/2001 | Smith | |
| 6,269,201 B1 | 7/2001 | Ko et al. | |
| 6,293,707 B1 | 9/2001 | Wild | |
| 6,296,397 B1 | 10/2001 | Bavington et al. | |
| 6,327,139 B1 | 12/2001 | Champion et al. | |
| 6,335,993 B1 | 1/2002 | Takahashi | |
| 6,356,697 B1 | 3/2002 | Braga et al. | |
| 6,392,149 B1 | 5/2002 | Kim et al. | |
| 6,424,781 B1 | 7/2002 | Puetz et al. | |
| 6,442,030 B1 | 8/2002 | Mammoser et al. | |
| 6,556,763 B1 | 4/2003 | Puetz et al. | |
| 6,650,805 B2 | 11/2003 | Chen et al. | |
| 6,902,069 B2 | 6/2005 | Hartman et al. | |
| 6,921,213 B2 | 7/2005 | Rosenberg et al. | |
| 6,925,241 B2 | 8/2005 | Bohle et al. | |
| 7,198,409 B2 | 4/2007 | Smith et al. | |
| 7,233,731 B2 | 6/2007 | Solheid et al. | |
| 7,315,681 B2 | 1/2008 | Kewitsch | |
| 7,335,056 B1 | 2/2008 | Clark et al. | |
| 7,352,945 B2 | 4/2008 | Holmberg et al. | |
| 7,397,997 B2 | 7/2008 | Ferris et al. | |
| 7,460,758 B2 | 12/2008 | Xin | |
| 7,746,667 B1 | 6/2010 | Baiza et al. | |
| 7,809,233 B2 | 10/2010 | Smith et al. | |
| 7,809,234 B2 | 10/2010 | Smith et al. | |
| 7,816,602 B2 | 10/2010 | Landry et al. | |
| 7,874,869 B2 | 1/2011 | Chern et al. | |
| RE42,258 E | 3/2011 | Thompson et al. | |
| 8,068,715 B2 | 11/2011 | Kewitsch | |
| 8,175,425 B2 | 5/2012 | Chen | |
| 8,179,684 B2 | 5/2012 | Smrha et al. | |
| 8,263,861 B2 | 9/2012 | Landry et al. | |
| 8,290,327 B2 | 10/2012 | Chen | |
| 8,705,929 B2 | 4/2014 | Kowalczyk et al. | |
| 8,731,361 B2 | 5/2014 | Anderson et al. | |
| 8,811,791 B2 | 8/2014 | Solheid et al. | |
| 8,861,918 B2 | 10/2014 | Vazquez et al. | |
| 8,938,147 B2 | 1/2015 | Krampotich et al. | |
| 8,939,792 B2 | 1/2015 | Takeuchi et al. | |
| 9,008,484 B2 | 4/2015 | Takeuchi et al. | |
| 9,071,890 B2 | 6/2015 | Ruiz | |
| 9,122,021 B2 | 9/2015 | Elenbaas et al. | |
| 9,201,206 B2 | 12/2015 | Smith et al. | |
| 9,335,484 B2 | 5/2016 | Pepe et al. | |
| 9,772,450 B2 | 9/2017 | Pepe et al. | |
| 9,880,358 B2 | 1/2018 | Chudoba et al. | |
| 10,917,168 B2 * | 2/2021 | Huang | H04B 10/071 |
| 11,029,474 B2 | 6/2021 | Yu et al. | |
| 11,243,361 B2 | 2/2022 | Masselin et al. | |
| 11,387,898 B2 * | 7/2022 | Wang | G01D 5/35358 |
| 11,531,170 B2 | 12/2022 | Takeuchi et al. | |
| 11,852,875 B2 | 12/2023 | Hill et al. | |
| 12,055,762 B2 * | 8/2024 | Takeuchi | G02B 6/44524 |
| 2001/0017480 A1 | 8/2001 | Ando | |
| 2002/0045387 A1 | 4/2002 | Schmidt et al. | |
| 2002/0117942 A1 | 8/2002 | Audibert et al. | |
| 2003/0113057 A1 | 6/2003 | Chen et al. | |
| 2003/0129871 A1 | 7/2003 | Follingstad | |
| 2004/0074852 A1 | 4/2004 | Knudsen et al. | |
| 2004/0178312 A1 | 9/2004 | Parsons | |
| 2004/0219829 A1 | 11/2004 | Clark et al. | |
| 2004/0251220 A1 | 12/2004 | Mertesdorf et al. | |
| 2005/0074202 A1 | 4/2005 | Ojima et al. | |
| 2005/0111809 A1 | 5/2005 | Giraud et al. | |
| 2006/0018622 A1 | 1/2006 | Caveney et al. | |
| 2006/0162948 A1 | 7/2006 | Rinderer et al. | |
| 2007/0082522 A1 | 4/2007 | Bonvallat et al. | |
| 2007/0096606 A1 | 5/2007 | Ryu | |
| 2007/0148992 A1 | 6/2007 | Sato et al. | |
| 2007/0189692 A1 | 8/2007 | Zimmel et al. | |
| 2007/0230889 A1 | 10/2007 | Sato et al. | |
| 2008/0002937 A1 | 1/2008 | Spisany et al. | |
| 2008/0175551 A1 | 7/2008 | Smrha et al. | |
| 2008/0205843 A1 | 8/2008 | Castonguay et al. | |
| 2009/0067800 A1 | 3/2009 | Vazquez et al. | |
| 2009/0078834 A1 | 3/2009 | Chen et al. | |
| 2009/0086441 A1 | 4/2009 | Randall et al. | |
| 2009/0238533 A1 | 9/2009 | Stansbury et al. | |
| 2010/0000758 A1 | 1/2010 | Bravo et al. | |
| 2010/0008623 A2 | 1/2010 | Arol et al. | |
| 2010/0021111 A1 | 1/2010 | Yu et al. | |
| 2010/0046885 A1 | 2/2010 | Chen | |
| 2010/0054659 A1 | 3/2010 | Pnini et al. | |
| 2010/0159742 A1 | 6/2010 | Chen | |
| 2010/0220964 A1 | 9/2010 | de Jong et al. | |
| 2010/0248535 A1 | 9/2010 | Chern et al. | |
| 2010/0303432 A1 | 12/2010 | Chen | |
| 2010/0310221 A1 | 12/2010 | Le Dissez | |
| 2010/0310225 A1 | 12/2010 | Anderson et al. | |
| 2011/0116757 A1 | 5/2011 | Vanmeulen et al. | |
| 2011/0235140 A1 | 9/2011 | Ito et al. | |
| 2011/0267794 A1 | 11/2011 | Anderson et al. | |
| 2011/0317971 A1 | 12/2011 | Zhang et al. | |
| 2012/0019117 A1 | 1/2012 | Dunwoody et al. | |
| 2012/0308178 A1 | 12/2012 | Chu et al. | |
| 2012/0321255 A1 | 12/2012 | Kewitsch | |
| 2013/0196538 A1 | 8/2013 | Takeuchi et al. | |
| 2013/0287356 A1 | 10/2013 | Solheid et al. | |
| 2014/0248028 A1 | 9/2014 | Campbell et al. | |
| 2014/0262487 A1 | 9/2014 | Takeuchi et al. | |
| 2014/0348481 A1 | 11/2014 | Giraud et al. | |
| 2014/0354131 A1 | 12/2014 | Takeuchi et al. | |
| 2014/0355217 A1 | 12/2014 | Takeuchi et al. | |
| 2014/0357118 A1 | 12/2014 | Takeuchi et al. | |
| 2015/0253529 A1 | 9/2015 | Lu et al. | |
| 2015/0268436 A1 | 9/2015 | Blackwell, Jr. et al. | |
| 2015/0277057 A1 | 10/2015 | Pepe et al. | |
| 2015/0301298 A1 | 10/2015 | Frith et al. | |
| 2015/0370027 A1 | 12/2015 | Geens et al. | |
| 2016/0047999 A1 | 2/2016 | Alexi et al. | |
| 2016/0274307 A1 | 9/2016 | Chudoba | |
| 2016/0309611 A1 | 10/2016 | Yi | |
| 2016/0330859 A1 | 11/2016 | Chen et al. | |
| 2017/0219779 A1 | 8/2017 | Takano et al. | |
| 2017/0274992 A1 | 9/2017 | Chretien | |
| 2018/0356603 A1 | 12/2018 | Ling | |
| 2019/0384016 A1 | 12/2019 | Yu et al. | |
| 2020/0150351 A1 | 5/2020 | Dong et al. | |

(56) References Cited

U.S. PATENT DOCUMENTS

| | | | |
|---|---|---|---|
| 2020/0166718 A1 | 5/2020 | Takeuchi et al. | |
| 2020/0200592 A1* | 6/2020 | Huang | H04B 10/071 |
| 2020/0225079 A1* | 7/2020 | Cedilnik | G01M 11/3109 |
| 2021/0191052 A1 | 6/2021 | Masselin et al. | |
| 2021/0266065 A1* | 8/2021 | Wang | G01D 5/35358 |
| 2021/0311261 A1 | 10/2021 | Zheng | |
| 2021/0356681 A1 | 11/2021 | Takeuchi et al. | |
| 2022/0003935 A1* | 1/2022 | Takeuchi | G02B 6/3514 |
| 2022/0026779 A1 | 1/2022 | Zheng | |
| 2022/0107470 A1 | 4/2022 | Kewitsch | |
| 2022/0128775 A1 | 4/2022 | Masselin et al. | |
| 2022/0196928 A1 | 6/2022 | Coenegracht | |
| 2022/0404560 A1 | 12/2022 | Hill et al. | |
| 2022/0413230 A1 | 12/2022 | Hill et al. | |
| 2024/0337792 A1* | 10/2024 | Takeuchi | G02B 6/3514 |

FOREIGN PATENT DOCUMENTS

| | | |
|---|---|---|
| CN | 1304569 A | 7/2001 |
| CN | 1353825 A | 6/2002 |
| CN | 2503628 Y | 7/2002 |
| CN | 2511052 Y | 9/2002 |
| CN | 1799296 A | 7/2006 |
| CN | 1897365 A | 1/2007 |
| CN | 101017968 A | 8/2007 |
| CN | 101480062 A | 7/2009 |
| CN | 101617541 A | 12/2009 |
| CN | 201365322 Y | 12/2009 |
| CN | 102027650 A | 4/2011 |
| CN | 102177633 A | 9/2011 |
| CN | 102202155 A | 9/2011 |
| CN | 103535048 A | 1/2014 |
| CN | 103975264 A | 8/2014 |
| CN | 105074525 A | 11/2015 |
| CN | 105075426 A | 11/2015 |
| CN | 205488871 U | 8/2016 |
| CN | 104053334 B | 11/2016 |
| DE | 19745568 A1 | 6/1999 |
| EP | 0207926 A2 | 1/1987 |
| EP | 0795935 A2 | 9/1997 |
| EP | 0989435 A1 | 3/2000 |
| JP | 3870788 B2 | 1/2007 |
| WO | 2008051436 A2 | 5/2008 |
| WO | 2014124001 A2 | 8/2014 |
| WO | 2020113100 A1 | 6/2020 |

OTHER PUBLICATIONS

Partial International Search Report for Application No. PCT/US2013/023176 dated May 2, 2013.

International Search Report for Application No. PCT/US2013/023176 dated Jun. 27, 2013.

International Search Report and Written Opinion for Application No. PCT/US2013/033701 dated Sep. 2, 2013.

International Search Report and Written Opinion for Application No. PCT/US2014/021953 dated Jun. 25, 2014.

Chinese Search Report for Application No. 201380016146.9 dated Sep. 25, 2017.

Extended European Search Report including Written Opinion for EP 17206049.3 dated Mar. 26, 2018.

Extended European Search Report for Application No. EP17206046 dated Mar. 26, 2018, 5 pages.

International Search Report from PCT/US2018/017924, dated Apr. 23, 2018, pp. 1-2.

Chinese Search Report for CN Application No. 2017106771995, dated Oct. 24, 2018.

Search Report from First Office Action for Chinese Application No. 2018800116517 issued May 27, 2021; 3 pages.

Physics Stack Exchange, "How to calculate loss due to Gaussian beam divergence of a laser going through multiple lenses"; <https://physics.stackexchange.com/questions/106216/how-to-calculate-loss-due-to-gaussian-beam-divergence-of-a-laser-going-through-m>, dated Apr. 2014.

Takeuchi, et al., U.S. Appl. No. 17/333,324, filed May 28, 2021, titled "Intelligent Panel System".

Extended European Search Report issued in Appln. No. 21183366.0 dated Feb. 9, 2022 (2 pages).

* cited by examiner

INTELLIGENT OPTICAL SWITCH

CROSS-REFERENCE TO RELATED APPLICATIONS

The present application is a continuation of U.S. application Ser. No. 17/366,551, filed on Jul. 2, 2021, which claims the benefit of the filing date of U.S. Provisional Patent Application No. 63/047,522, filed Jul. 2, 2020, the entire disclosures of which are hereby incorporated herein by reference.

BACKGROUND

Optical fibers are optically connected to respective opposing optical fibers to convey signals between the respective connected fibers, which may occur in the operation of data storage and transmission devices. To establish connections between respective opposing optical fibers, connectors on ends of respective opposing optical fibers are inserted into ports on opposing ends of adapters.

Sometimes optical connections between opposing optical fibers need to be changed due to service disruptions and failures, due to a need to reduce the latency of a particular optical signal being conveyed, or simply due to a customer associated with optical signals being conveyed along a particular fiber ending a subscription to a service, e.g., a cable service. In such circumstances, technicians need to travel to the site of the interconnection of the opposing optical fibers, open an enclosure where such interconnection is made, remove one of the interconnected optical fibers to break the optical connection between the fibers, and when appropriate connect another optical fiber within the enclosure in place of the removed optical fiber to restore or replace service. Travel and labor costs due to these disruptions are inefficient and undesirable.

Therefore, there exists a need for improvements in switching optical fiber connections.

BRIEF SUMMARY

In accordance with an aspect, an optical switch may include a first connector assembly, a plurality of optical port assemblies, and a frame assembly. The first connector assembly may include a first optical fiber connector and a first optical fiber having an end extending from the first optical fiber connector. The plurality of optical port assemblies may be fixed in position relative to each other. The frame assembly may include a first frame that may be directly attached to the connector assembly or directly attached to the plurality of port assemblies. The first frame may be moveable to align the first optical fiber connector with any one of the port assemblies. The first optical fiber connector may be insertable into each one of the port assemblies when the first optical fiber connector is aligned with a respective one of the port assemblies by moving the first optical fiber connector or the respective port assembly aligned with the first optical fiber connector along a single axis and into the respective port assembly.

In some arrangements, the plurality of port assemblies may be aligned around a linear or curvilinear axis and each pair of adjacent port assemblies of the plurality of port assemblies may be spaced apart the same fixed distance from each other.

In some arrangements, the optical switch further may include a drive mechanism attached to the first connector assembly. The drive mechanism may be configured to apply a force to the first connector assembly to insert the first optical fiber connector into any one of the port assemblies. The drive mechanism may change from a compression state or a tension state to a relaxed state to cause the first optical fiber connector to be inserted into one of the port assemblies.

In some arrangements, the first frame may be attached to the first optical fiber connector. In some other arrangements, the first frame may be attached to each of the plurality of port assemblies.

In some arrangements, each one of the plurality of port assemblies may include a port defining an opening. In some such arrangements, each of the openings of the plurality of port assemblies may lie substantially within a first plane such that the first optical fiber connector may be inserted in an orthogonal direction to the first plane. In other such arrangements, the openings of the plurality of port assemblies may be arranged in a circular pattern.

In some arrangements, the optical switch further may include a plurality of connector assemblies including the first connector assembly. In such arrangements, each one of the plurality of connector assemblies may be identical to the first connector assembly. Optical fiber connectors of each one of the plurality of connector assemblies may be configured for alignment with and insertion into each one of the port assemblies.

In some arrangements, the optical switch may further include an arm that may push or pull a selected optical fiber connector of the optical fiber connectors of the plurality of connector assemblies to insert the selected optical fiber connector into a respective one of the port assemblies aligned with the selected optical fiber connector.

In some arrangements, the arm may rotate or revolve about an arm axis. The arm may include a finger that extends toward or away from the arm axis. The finger may be configured for contacting a connector surface of the selected optical fiber connector to move the selected optical fiber connector into the respective one of the port assemblies aligned with the selected optical fiber connector.

In some such arrangements, either one or both of (i) the selected optical fiber connector may move toward or away from the arm axis or (ii) the finger may move toward or away from the arm axis such the finger overlaps with the connector surface of the selected optical fiber connector. In such arrangements, the finger may overlap the connector surface when the finger contacts the connector surface to move the selected optical fiber connector into a port defined by the respective one of the port assemblies aligned with the selected optical fiber connector.

In some arrangements, the plurality of connector assemblies may be arranged about a central axis. In such arrangements, the arm may extend along the central axis between the plurality of connector assemblies.

In some such arrangements, the plurality of connector assemblies may revolve about the arm. In some other such arrangements, the arm may rotate without the optical fiber connectors of the plurality of connector assemblies rotating about the central axis.

In some arrangements, the arm may revolve around the optical fiber connectors of the plurality of connector assemblies.

In some arrangements, the optical fiber connectors of the plurality of connector assemblies may revolve around a central axis and the arm may translate in a direction parallel to the single axis and to the central axis. In some such arrangements, the arm may push or pull the selected optical fiber connector merely by contact with the selected optical fiber connector and without any need to grab or otherwise squeeze the selected optical fiber connector. In some other such arrangements, the arm may also translate in a direction orthogonal to the central axis. In some such arrangements, the arm only contact the selected optical fiber connector upon translation in the direction orthogonal to the central axis.

In some arrangements, the arm may not rotate.

In some arrangements, the plurality of port assemblies may revolve around the central axis.

In some arrangements, each one of the plurality of port assemblies may include a port configured for receiving each one of the optical fiber connectors of the plurality of connector assemblies. In some such arrangements, the optical fiber connectors of the plurality of connector assemblies and the ports of the plurality of port assemblies may lie in a single plane.

In some arrangements, each one of optical fiber connectors of the plurality of connector assemblies may be an MPO connector. In some arrangements, the MPO connector may include at least twenty-four (24) fibers.

In some arrangements, the optical switch further may include an actuation mechanism configured for driving the first connector assembly to insert the first optical fiber connector into the respective one of the port assemblies aligned with the first optical fiber connector.

In some arrangements, the actuation mechanism may be rotatable to rotate the first optical fiber connector to extend in at least a plurality of directions within an insertion plane in order to align the first optical fiber connector to be inserted into the respective one of the port assemblies aligned with the first optical fiber connector.

In some arrangements, the actuation mechanism further may include a rack-and-pinion drive, a screw drive, or a worm gear drive for moving the first optical fiber connector along the single axis.

In some arrangements, the actuation mechanism further may include a shaft. The first optical fiber connector may be slidable along the shaft to align the first optical fiber connector with the respective one of the port assemblies.

In some arrangements, the actuation mechanism may include a cam. The cam may rotate eccentrically to push the first optical fiber connector and thereby insert the first optical fiber connection into the respective one of the port assemblies.

In some arrangements, the actuation mechanism may include a slider-crank mechanism. A crank of the slider-crank mechanism may rotate to cause a slider of the slider-crank mechanism to push the first optical fiber connector and thereby insert the first optical fiber connection into the respective one of the port assemblies.

In some arrangements, the first frame may be controlled from a remote location such that the first frame may move only upon direction received from the remote location.

In some arrangements, any one or any combination of the port assemblies may include an adapter and a connector assembly inserted into the adapter.

In accordance with another aspect, an optical switching system may include a first optical fiber assembly, a second optical fiber assembly, a third optical fiber assembly, a fourth optical fiber, and a fifth optical fiber. The first optical fiber assembly may include a first optical fiber and a first optical switch. The second optical fiber assembly may include a second optical fiber and a second optical switch. The third optical fiber assembly may include a third optical fiber and a third optical switch. The fourth optical fiber may be in optical communication with the first optical fiber via the first optical switch and in optical communication with the second optical fiber via the second optical switch. The fifth optical fiber may be in optical communication with the first optical fiber via the first optical switch and in optical communication with the third optical fiber via the third optical switch.

In some arrangements, the first optical fiber may be attached to the first optical switch by a first connector, the second optical fiber may be attached to the second optical switch by a second connector, the third optical fiber may be attached to the third optical switch by a third connector, the fourth optical fiber may be attached to the first optical switch by a fourth connector and to the second switch by a fifth connector, the fifth optical fiber may be attached to the first optical switch by a sixth connector and to the third optical switch by a seventh connector. In some arrangements, each of the first, the second, and the third optical switches may include respective optical port assemblies or ports for connection with a respective one of the first, the second, the third, the fourth, the fifth, the sixth, and the seventh connectors.

In some arrangements, the optical switching system further may include a fourth optical fiber assembly, a seventh optical fiber, and an eighth optical fiber. The fourth optical fiber assembly may include a sixth optical fiber and a fourth optical switch. The seventh optical fiber may be in optical communication with the sixth optical fiber via the fourth optical switch and in optical communication with the second optical fiber via the second optical switch. The eighth optical fiber may be in optical communication with the sixth optical fiber via the fourth optical switch and in optical communication with the third optical fiber via the third optical switch.

In some arrangements, the optical switching system further may include a first input port assembly and a first output port assembly which may be optical port assemblies. The first optical fiber and the sixth optical fiber both may be received in the first input port assembly and both may be configured for optical communication with respective optical fibers received within the first input port assembly. The second optical fiber and the third optical fiber both may be received in the first output port assembly and both may be configured for optical communication with respective optical fibers received within the first output port assembly.

In some arrangements, the optical switching system further may include a printed circuit board. In such arrangements, the first optical switch, the second optical switch, the third optical switch, the fourth optical switch, the first input port assembly, and the first output port assembly may be attached to the printed circuit board.

In some arrangements, the optical switching system further may include a ninth optical fiber, a tenth optical fiber, a second input port assembly, a fifth optical fiber assembly, and a sixth optical fiber assembly. The ninth optical fiber may be received within the first output port assembly such that the ninth optical fiber may be in optical communication with the second optical fiber. The tenth optical fiber may be received within the first output port assembly such that the tenth optical fiber may be in optical communication with the third optical fiber. The ninth optical fiber and the tenth optical fiber both may be received in the second input port assembly. The fifth optical fiber assembly may include an eleventh optical fiber and a fifth optical switch. The ninth optical fiber may be in optical communication with the eleventh optical fiber via the second input port assembly. The sixth optical fiber assembly may include a twelfth optical fiber and a sixth optical switch. The tenth optical fiber may be in optical communication with the twelfth optical fiber via the second input port assembly.

In some arrangements, the optical switching system further may include a seventh optical fiber assembly, an eighth optical fiber assembly, a fifteenth optical fiber, a sixteenth optical fiber, and a second output port assembly. The seventh optical fiber assembly may include a thirteenth optical fiber and a seventh optical switch. The eighth optical fiber assembly may include a fourteenth optical fiber and an eighth optical switch. The fifteenth optical fiber may be in optical communication with the eleventh optical fiber via the fifth optical switch and may be in optical communication with the thirteenth optical fiber via the seventh optical switch. The sixteenth optical fiber may be in optical communication with the twelfth optical fiber via the sixth optical switch and may be in optical communication with the fourteenth optical fiber via the eighth optical switch. The thirteenth optical fiber and the fourteenth optical fiber both may be received in the second output port assembly and both may be configured for optical communication with respective optical fibers received within the second output port assembly.

In some arrangements, the optical switching system further may include first printed circuit board (PCB) and a second PCB. The first optical switch, the second optical switch, the third optical switch, the fourth optical switch, the first input port assembly, and the first output port assembly may be attached to the first PCB and in combination with the first PCB define a first PCB assembly. The fifth optical switch, the sixth optical switch, the seventh optical switch, the eighth optical switch, the second input port assembly, and the second output port assembly may be attached to the second PCB and in combination with the second PCB define a second PCB assembly. The first PCB assembly may be stacked above or below the second PCB assembly.

In accordance with another aspect, an optical system may include a plurality of first connectors, a plurality of second connectors, a first optical switch, and a first component. The plurality of first connectors may be configured for conveying optical signals. The plurality of second connectors may be configured for conveying optical signals. The first optical switch may be configured for conveying optical signals conveyed from one or both of the plurality of first connectors and the plurality of second connectors. The first optical switch may be configured for selectively passing optical signals conveyed from the one or both of the plurality of first connectors and the plurality of second connectors to the first component.

In some arrangements, the optical system further may include a plurality of first adapters and a plurality of second adapters. The first connectors may be received in respective ones of the first adapters in which the first adapters may define a set of first ports of the optical system. The second connectors may be received in respective ones of the second adapters in which the first adapters may define a set of first ports of the optical system.

In some arrangements, the optical system further may include an optical filter. The first optical switch may be configured for receiving optical signals conveyed from the one or both of the plurality of first connectors and the plurality of second connectors from the optical filter.

In some arrangements, the optical filter may be a wavelength division multiplexing (WDM) or optical tap module.

In some arrangements, the optical system may further include a second component as well as an optical splitter or a second optical switch configured for conveying optical signals. The first component may be in optical communication with the one of the optical splitter and the second optical switch. The second component may be in optical communication with the one of the optical splitter and the second optical switch. In arrangements having the optical splitter, the optical signals received by the optical splitter may be filtered into a first portion conveyed to the first component and a second portion conveyed to the second component. In arrangements having the second optical switch, the optical signals received by the second optical switch may be conveyed to either the first component or the second component.

In some arrangements, the optical splitter may be a wavelength division multiplexing (WDM) unit.

In some arrangements, the first optical switch may be configured to convey optical signals conveyed from only one of the plurality of first connectors to the optical splitter or from only one of the plurality of second connectors to the optical splitter.

In some arrangements, the first optical switch may be configured to convey optical signals conveyed from more than one of the plurality of first connectors and the plurality of second connectors to the optical splitter.

In some arrangements, the optical splitter may be configured for conveying optical signals conveyed from only one of the plurality of first connectors to the first component or to the second component or from only one of the plurality of second connectors to the first component or to the second component.

In some arrangements, the optical system further may include first optical fibers extending between the first optical switch and the plurality of first connectors and second optical fibers extending between the first optical switch and the plurality of second connectors.

In some arrangements, each of the first component and the second component may be a distributed acoustic sensing (DAS) module, an optical time-domain reflectometer (OTDR), an optical transmitter, or an optical receiver and the second component in which the first component is different than the second component.

In some arrangements, the first optical switch may be configured for switching optical signals being conveyed from a first connector of the plurality of first connectors or the plurality of second connectors to a first connector of the other of the plurality of first connectors or the plurality of second connectors to being conveyed from the first connector to a second connector of the other of the plurality of first connectors or the plurality of second connectors.

In accordance with another aspect, an optical system may include a first connector, a second connector, a first optical switch, an optical splitter or a second optical switch, a first component, and a second component. The first connector may be configured for conveying optical signals. The second connector may be configured for conveying optical signals. The first optical switch may be configured for conveying optical signals conveyed from one or both of the first connector and the second connector. The one of the optical splitter or the second optical switch may be configured for conveying optical signals. The first component may be in optical communication with the one of the optical splitter or the second optical switch. The second component may be in optical communication with the one of the optical splitter and the second optical switch. The first optical switch may be configured for selectively passing optical signals conveyed from the one or both of the plurality of first connectors and the plurality of second connectors to the one of the optical splitter and the second optical switch. In arrangements having the optical splitter, optical signals received by the optical splitter may be filtered into a first portion conveyed to the first component and a second portion conveyed to the second component. In arrangements having the second optical switch, optical signals received by the second optical switch may be conveyed to either the first component or the second component.

In some arrangements, the optical system may further include an optical filter. In some such arrangements, the first optical switch may be configured for receiving optical signals conveyed from the one or both of the first connector and the second connector from the optical filter. In some such arrangements, the optical filter may be a wavelength division multiplexing (WDM) or optical tap module.

In some arrangements having an optical splitter, the optical splitter may be a wavelength division multiplexing (WDM) unit.

In accordance with another aspect, an optical switch may include a first set of first optical fiber and first collimator assemblies, a second set of second optical fiber and second collimator assemblies, and an array of mirrors. Any one or any combination of the mirrors of the array of mirrors may be moveable between respective first and second mirror positions for each of the moveable mirrors. When a first mirror of the array of mirrors is in the first mirror position, the first mirror may route light conveyed from only i) a corresponding one of the first set of first optical fiber and first collimator assemblies to a corresponding one of the second set of second optical fiber and second collimator assemblies and ii) the corresponding one of the second set of second optical fiber and second collimator assemblies to the corresponding one of the first optical fiber and first collimator assemblies.

In some arrangements, the optical switch may further include a third set of third optical fiber and third collimator assemblies. When the first mirror and a column of mirrors aligned with the first mirror and with each other are in the second mirror position, light conveyed from the corresponding one of the first set of first optical fiber and first collimator assemblies may be routed to a corresponding one of the third set of third optical fiber and third collimator assemblies.

In some arrangements, the moveable mirrors may be vertically moveable between first and second positions within first and second horizontal planes.

In some arrangements, each first optical fiber and first collimator assembly of the first set of first optical fiber and first collimator assemblies, each second optical fiber and second collimator assembly of the second set of second optical fiber and second collimator assemblies, and each third optical fiber and third collimator assembly of the third set of third optical fiber and third collimator assemblies may include an optical fiber attached, whether directly or indirectly, to and in optical communication with a fiber optical collimator.

In some arrangements, in the second mirror position, light conveyed from the corresponding one of the third set of third optical fiber and third collimator assemblies may be routed to the corresponding one of the first set of first optical fiber and first collimator assemblies.

In some arrangements, at least one mirror of the array of mirrors may be part of a mirror assembly. In such arrangements, the mirror assembly may further include a first fixation structure, a second fixation structure, and a catch attached to the mirror. The catch and the mirror may be selectively moveable, in tandem, between the first fixation structure and the second fixation structure.

In accordance with an aspect, a mirror assembly may include a mirror, a first fixation structure, a second fixation structure, and a catch attached to the mirror. The catch and the mirror may be selectively moveable, in tandem, between the first fixation structure and the second fixation structure.

In some arrangements, the catch may be maintained on a first side of the second fixation structure and in a first region between the first fixation structure and the second fixation structure. In such arrangements, the mirror may be on a second side of the second fixation structure opposite the first side and may be outside the first region.

In some arrangements, the mirror assembly may further include a probe. In such arrangements, the catch may be moveable from the first fixation structure to the second fixation structure upon sufficient contact of the probe with the catch when the catch is in contact with the first fixation structure. In some such arrangements, the catch may be further moveable from the second fixation structure to the first fixation structure upon sufficient contact of the probe with the catch when the catch is in contact with the second fixation structure.

In some arrangements, the mirror assembly may include a controller. The controller may convey electrical signals to the probe to cause the probe to sufficiently contact the catch to move the catch to the second fixation structure when the catch is in contact with the first fixation structure. In some such arrangements, the catch may be further moveable from the second fixation structure to the first fixation structure upon sufficient contact of the probe with the catch when the catch is in contact with the second fixation structure. In such arrangements, the controller may further convey electrical signals to the probe to cause the probe to sufficiently contact the catch to move the catch to the first fixation structure when the catch is in contact with the second fixation structure.

In accordance with another aspect, an optical switch may include a first set of first optical fiber and first collimator assemblies, a second set of second optical fiber and second collimator assemblies, and an array of mirrors. Any one or any combination, including all, of the mirrors may be moveable between a first mirror position and a second mirror position. When a first mirror of the array of mirrors is in the first mirror position, the first mirror may route light conveyed from only a corresponding one of the first set of first optical fiber and first collimator assemblies to a corresponding one of the second set of second optical fiber and second collimator assemblies.

In some arrangements, the optical switch may further include a third set of third optical fiber and third collimator assemblies. When the first mirror and a column of mirrors aligned with the first mirror and with each other are in the second mirror position, light conveyed from the corresponding one of the first set of first optical fiber and first collimator assemblies may be routed to a corresponding one of the third set of third optical fiber and third collimator assemblies.

In some arrangements, the moveable mirrors may be vertically moveable between first and second positions within first and second horizontal planes.

In some arrangements, each first optical fiber and first collimator assembly of the first set of first optical fiber and first collimator assemblies, each second optical fiber and second collimator assembly of the second set of second optical fiber and second collimator assemblies, and each third optical fiber and third collimator assembly of the third set of third optical fiber and third collimator assemblies may include an optical fiber attached, whether directly or indirectly, to and in optical communication with a fiber optical collimator.

In some arrangements, at least one mirror of the array of mirrors may be part of a mirror assembly. In such arrangements, the mirror assembly may further include a first fixation structure, a second fixation structure, and a catch attached to the mirror. The catch and the mirror may be selectively moveable, in tandem, between the first fixation structure and the second fixation structure.

BRIEF DESCRIPTION OF THE DRAWINGS

By way of description only, embodiments of the present disclosure are described herein with reference to the accompanying figures, in which.

DETAILED DESCRIPTION

As used herein, the term "optical signals" refers to ones that are created by the transmission of light beams. Such signals may be formed by modulating the intensity of light beams from a light source or by modulating the frequency of the transmission of light beams from a light source.

The term "input" is generally understood to refer to a side of a component with which the term is used that receives optical signals whereas the term "output" is generally understood to refer to a side of a component with which the term is used that conveys optical signals away from such component. However, unless expressly indicated otherwise, as used herein, the terms "input" and "output" are interchangeable, are merely used to distinguish the same components that are used at opposing sides of a system and are not intended to be limited as the terms otherwise suggest. Accordingly, components modified with the term "input" are intended to both receive and convey optical signals and likewise components modified with the term "output" are intended to both receive and convey optical signals.

Figure 1A:
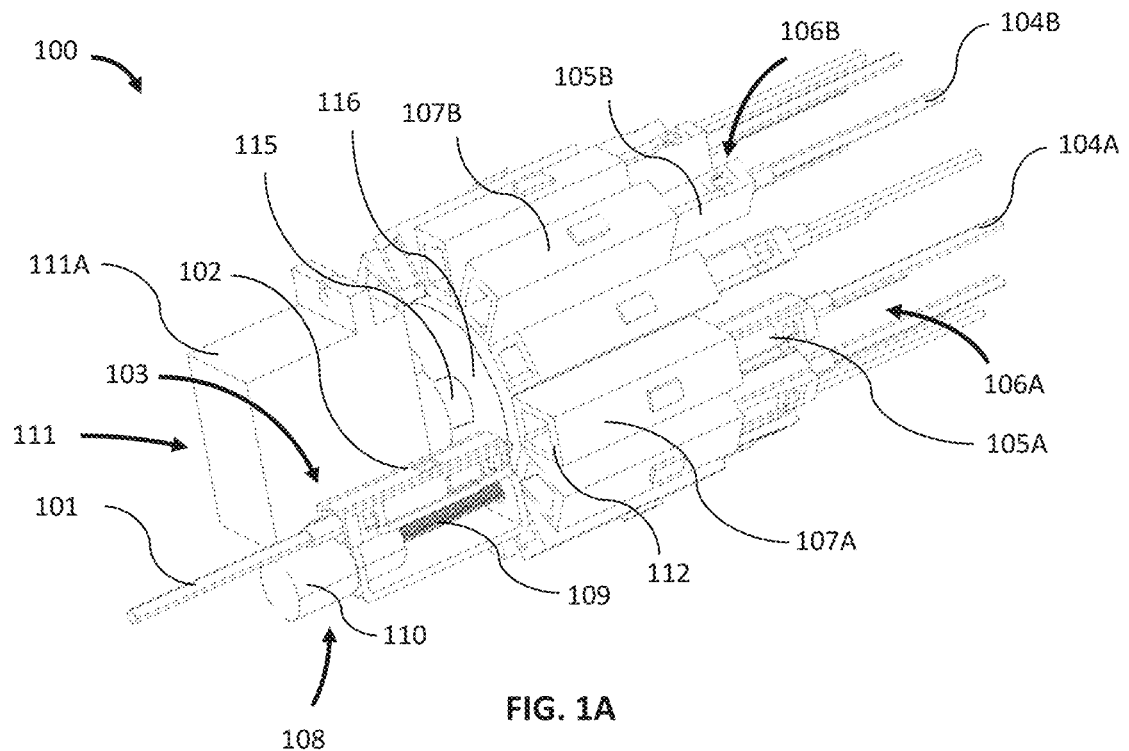
FIGS. 1A-6 are perspective views of optical assemblies in accordance with various embodiments.
Figure 1B:
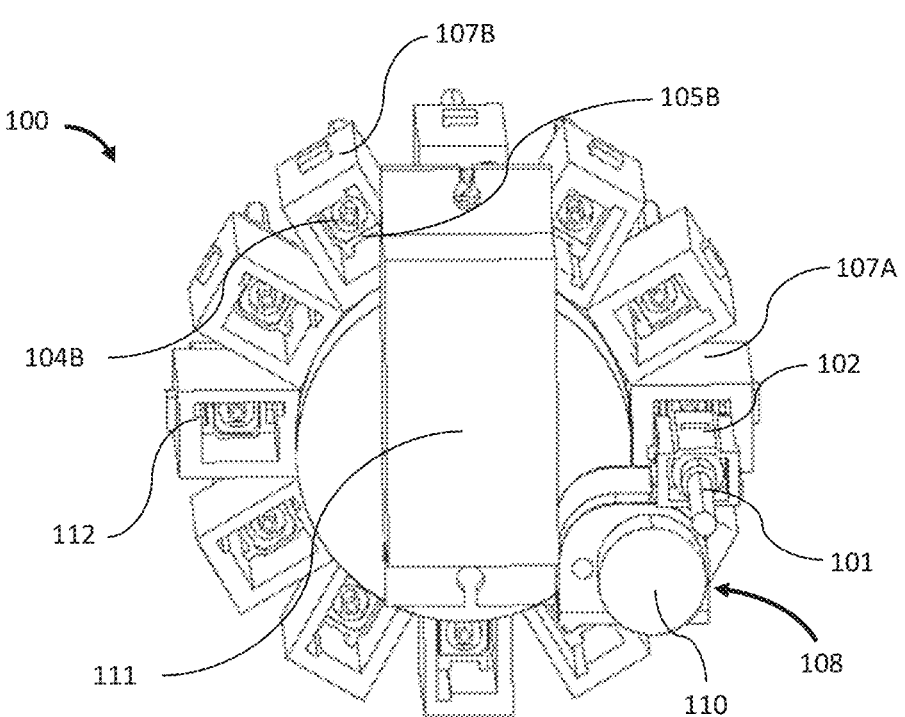

Referring now to FIGS. 1A-6, optical switches 100-400A are assemblies providing for interchangeable optical connections between input and output optical fibers in which the change of connections may be directed remotely, for example, to a central office of an Internet service provider (ISP), and in which the changes may be affected by end actuator, robot, or other actuation system. As shown in FIGS. 1A and 1B, optical switch 100 includes input optical fiber 101 and associated input optical fiber connector 102 that in combination define input connector assembly 103, a plurality of output optical fibers 104A, 104B and associated output optical fiber connector 105A, 105B in which each associated output optical fiber and output optical fiber connector pair define a respective output connector assembly 106A, 106B, linear actuation mechanism 108, and rotary actuation mechanism 111. As further shown, an end of each output connector assembly 106A, 106B is inserted into a respective one of optical adapters 107A, 107B. In some arrangements, each combination of output connector assembly 106A, 106B and optical adapter 107A, 107B may be preassembled during fabrication of optical switch 100.

As shown, a rotary actuation mechanism 111 includes rotary drive system 111A, shaft 115, and frame 116 attached to the rotary drive system by the shaft. Drive system 111A may include a housing as shown into which shaft 115 may extend, an electric motor (not shown), in some arrangements a gear system, and in some arrangements a rotary encoder. As shown, drive system 111A is on the same side of adapters 107A, 107B as input optical fiber connector 102, although in alternative arrangements, drive system 111A may be on the opposite side of the adapters behind and spaced from the output connector assemblies 106A, 106B. Each of optical adapters 107A, 107B is attached to frame 116 such that the set of connector assemblies 106A, 106B may be rotated along with their respective optical adapters both clockwise and counterclockwise about a central axis extending substantially parallel to the direction in which the connector assemblies and adapters extend. In this manner, input connector assembly 103 may be aligned with output optical fiber 104A via insertion of output optical connector 105A into output adapter 107A and thereby not aligned with the plurality of output optical fibers 104B and their associated output optical connectors 105B defining output connector assemblies 106B and not aligned with the plurality of optical adapters 107B. As in the example shown, openings of ports 112 of each of the plurality of adapters 107A, 107B configured for receiving an end of connector 102 may be aligned such that the ports are coplanar.

As further shown, optical assembly 100 may further include linear actuation mechanism 108 that includes linear actuation shaft 109, which may be for example an elongated screw, attached to connector assembly 103 and driver mechanism 110, which may be for example an electrical motor or a gearbox attached to an electrical motor, attached to the elongated screw such that upon energizing the driver mechanism, the elongated screw may be translated in a direction along an axis of the screw. In this manner, when input connector assembly 103 is aligned with adapter 107A and actuation mechanism 108 is energized, translation of linear actuation shaft 109 causes the connector assembly to be inserted into aligned optical adapter 107A such that optical fiber 101 is in alignment with aligned optical fiber 104A. In some arrangements, linear actuation shaft 109 may be replaced by a rack-and-pinion, worm gear drive, or other devices configured for inserting the connector assembly into the aligned optical adapter.

In some alternative arrangements, one or more, or even all, of output optical connectors 105A, 105B and their associated adapters 107, 107B into which the output optical connectors are inserted each may have a single, continuous cover into which the associated one of output optical fiber 104A, 104B is inserted such that a portion of the cover over the end of the associated output optical fiber and the portion of the cover over the associated port of the adapter are inseparable without fracture of the cover. As used herein, the term "port assembly" shall refer to such inseparable arrangements as well as arrangements described previously herein having both an adapter and a connector assembly inserted into the adapter. In some alternative arrangements, rotary actuation mechanism 111 and input connector assembly 103 may be rotated while the combinations of the output optical assemblies 106A, 106B and their associated optical adapters 107A, 107B into which the output optical assemblies are inserted remain stationary. In this manner, input connector assembly 103 may be aligned and inserted into any one of optical adapters 107A, 107B in alignment and thus configured for optical communication with the output optical assemblies 106A, 106B.

Each of rotary actuation mechanism 111 and linear actuation mechanism 108 may be in electrical communication to a central processing unit (CPU) or separate CPUs (not shown) through which these mechanisms may be powered, although electrical power may be provided separately. The CPU, or CPUs, provides an electrical control signal, which may be directed from a remote location by an ISP central office, to rotary actuation mechanism 111 and linear actuation mechanism 108 to actuate rotary drive system 111A to rotate shaft 115 in the case of rotary actuation mechanism 111 and an electrical control signal to linear actuation mechanism 108 to translate linear actuation shaft 109. Each of rotary actuation mechanism 111 and linear actuation mechanism 108 may provide feedback, e.g., closed loop feedback, to the respective CPU or CPUs to indicate the changed position of the respective one of shaft 115 (or corresponding component of rotary drive system 111A that rotates with the shaft) or linear actuation shaft 109. The changed positions of the one or both of shaft 115 (or corresponding component of rotary drive system 111A) and linear actuation shaft 109 would then be stored in the CPU as current positions such that future adjustments to the one or both of the shaft (or corresponding component of the rotary drive system) and linear actuation shaft would be based on such current positions.

Figure 2:
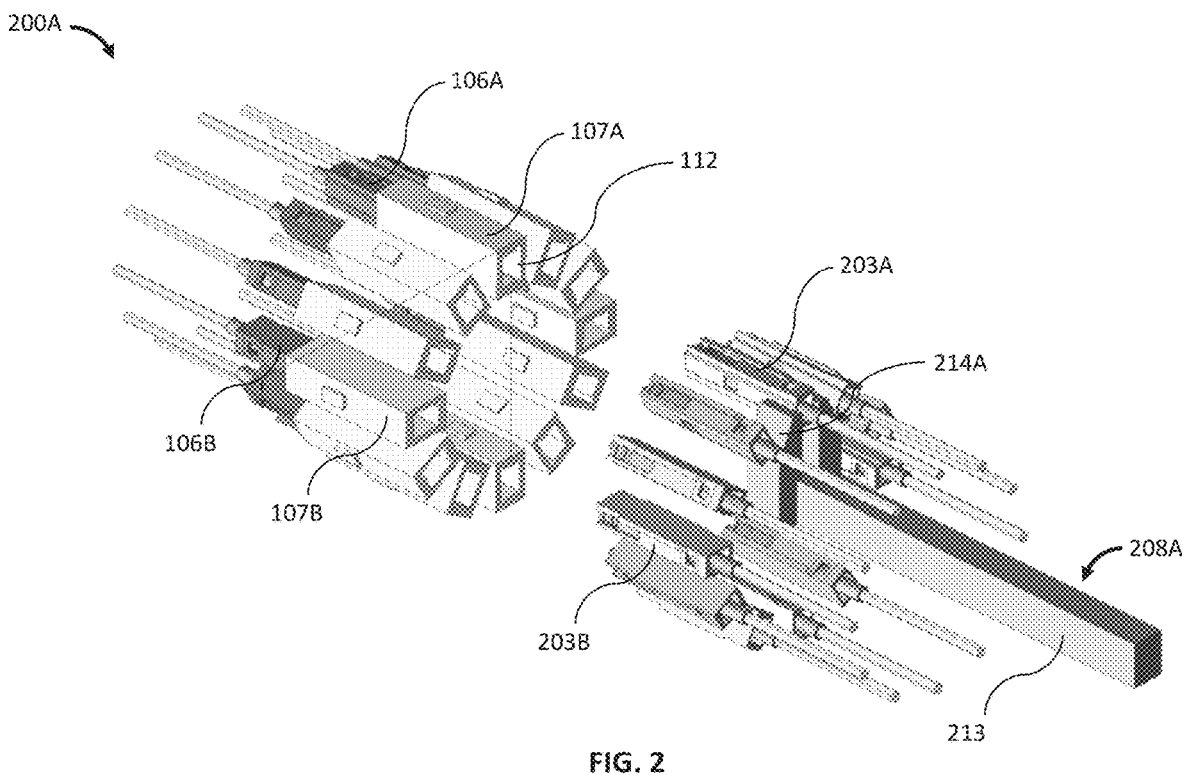

Referring now to FIG. 2, optical switch 200A includes output optical assemblies 106A, 106B and their associated optical adapters 107A, 107B in the same configuration as in optical assembly 100. Optical assembly 200A further includes input connector assemblies 203A, 203B and actuation mechanism 208A. Actuation mechanism 208A includes arm 213 and a pair of opposing fingers 214A extending from an end of the arm.

In one arrangement, as with optical assembly 100, output optical assemblies 106A, 106B and their associated adapters 107A, 107B rotate about the central axis until the connector of the desired output connector assembly 106A is aligned with desired input optical assembly 203A. Arm 213 also rotates about a central axis defined by the arm while the set of input connector assemblies 203A, 203B do not rotate. When fingers 214A of arm 213 are pointed in the direction towards input connector assembly 203A desired for insertion into adapter 107A into which output connector assembly 106A is received, arm 213 and thus fingers 214A translate towards desired connector assembly 203A until the fingers are on opposing sides of the connector of the desired input connector assembly in order to grab the connector assembly or to at least contact a surface or surfaces of the connector assembly while pushing or pulling the connector assembly into port 112 of connector adapter 107A. In this manner, the optical fiber of connector assembly 203A is placed into alignment with the optical fiber of connector assembly 106A.

In alternative arrangements, the set of input connector assemblies 203A, 203B may be rotated about a central axis defined by these connector assemblies in conjunction with the rotation of the sets of the connected output connector assemblies 106A, 106B and adapters 107A, 107B to place the optical fiber of connector assembly 203A into alignment with the optical fiber of connector assembly 106A. In some such arrangements in which both the set of attached output connector assemblies 106A, 106B and output connector adapters 107A, 107B and the set of input connector assemblies 203A, 203B are rotated, arm 213 of actuation mechanism 208 may rotate, while in other such arrangements, the arm may not rotate and instead may merely translate to grab or otherwise contact the desired input connector assembly 203A. In arrangements in which arm 213 is not rotated, both the set of desired attached output connector assembly 106A and output connector adapter 107A and desired input connector assembly 203A must be rotated to the rotational position at which fingers 214A of arm 213 are aligned to contact desired input connector assembly 203A to insert the desired input connector assembly into desired output connector adapter 107A for alignment of the optical fiber of the desired input connector assembly with optical fiber 104A of output connector assembly 106A.

In another alternative arrangement, both the set of input connector assemblies 203A, 203B and arm 213 may rotate while the set of attached output connector assemblies 106A, 106B and output connector adapters 107A, 107B does not rotate. In such an arrangement, desired input connector assembly 203A and arm 213 are rotated to the rotational position of desired out connector adapter 107A such that fingers 214A of arm 213 are aligned to contact desired input connector assembly 203A to insert the desired input connector assembly into desired output connector adapter 107A for alignment of the optical fiber of the desired input connector assembly with optical fiber 104A of output connector assembly 106A.

In each of these arrangements as well as in the arrangement of optical switch 100, the set of attached output connector assemblies 106A, 106B and output connector adapters 107A, 107B, arm 213, the set of input connector assemblies 203A, 203B, and the combination of rotary actuation mechanism 111 and input connector assembly 103 may be rotated both clockwise and counterclockwise such that these sets or combinations of components never need to be rotated about their respective central axis defined by the respective sets of these components more than 180 degrees in order to align the desired output connector assembly with the desired input connector assembly. In this manner, twisting of optical fibers of input connector assembly 103, input connector assemblies 203A, 203B, and output connector assemblies 106A, 106B, when such assembly or assemblies are rotated, may be reduced. Additionally, rotations of even less than 180 degrees of the set of attached output connector assemblies 106A, 106B and output connector adapters 107A, 107B, arm 213, the set of input connector assemblies 203A, 203B, and the combination of rotary actuation mechanism 111 and input connector assembly 103, when rotated, would be possible while still providing for alignment of any one of the output connector assemblies with input connector assembly 103 or with any one of input connector assemblies 203A, 203B when rotation of the set of attached output connector assemblies 106A, 106B and output connector adapters 107A, 107B, arm 213, the set of input connector assemblies 203A, 203B, and the combination of rotary actuation mechanism 111 and input connector assembly 103 is combined with rotation of another corresponding one of the set of attached output connector assemblies 106A, 106B and output connector adapters 107A, 107B, arm 213, the set of input connector assemblies 203A, 203B, and the combination of rotary actuation mechanism 111 and input connector assembly 103.

Figure 3:
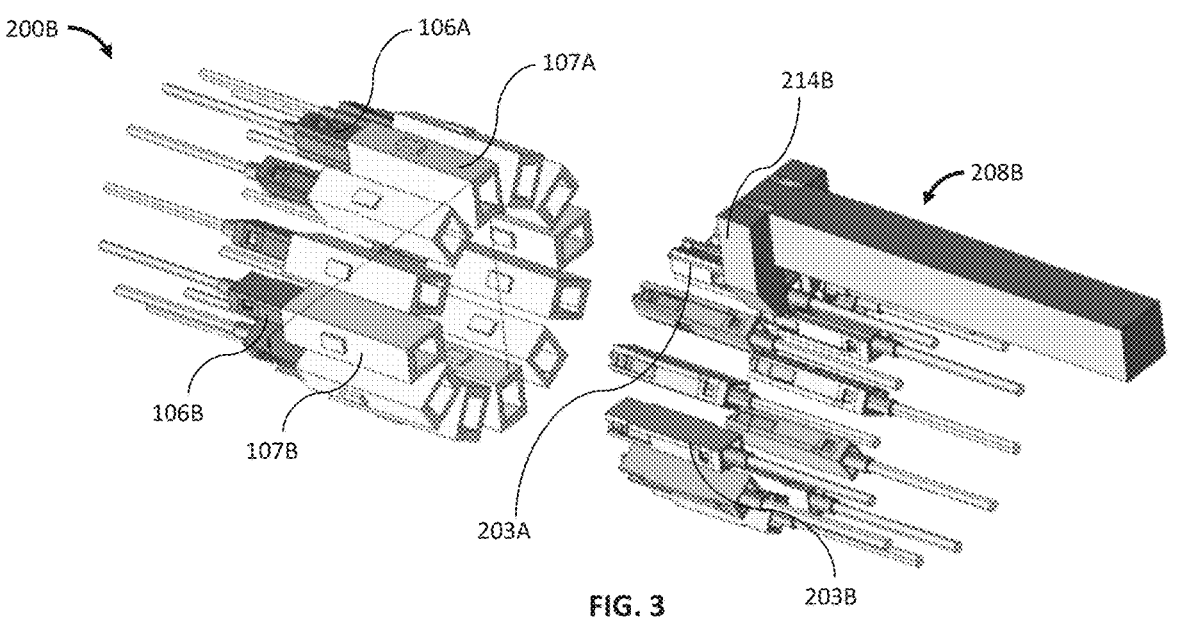

As shown in FIG. 3, in some alternative arrangements which may otherwise be the same as the arrangement of optical switch 200A and its alternative arrangements discussed previously herein, optical switch 200B includes actuation mechanism 208 having fingers 214B pointing towards the central axis defined by the set of input connector assemblies 203A, 203B rather than pointing outwardly relative to the central axis as in the example of optical switch 200A. In some such alternative arrangements, actuation mechanism 208B may revolve around the set of input connector assemblies 203A, 203B in which in some variations the set of the input connector assemblies may not rotate while in other variations such set of connector assemblies may rotate about the central axis defined by such set of assemblies.

Figure 4:
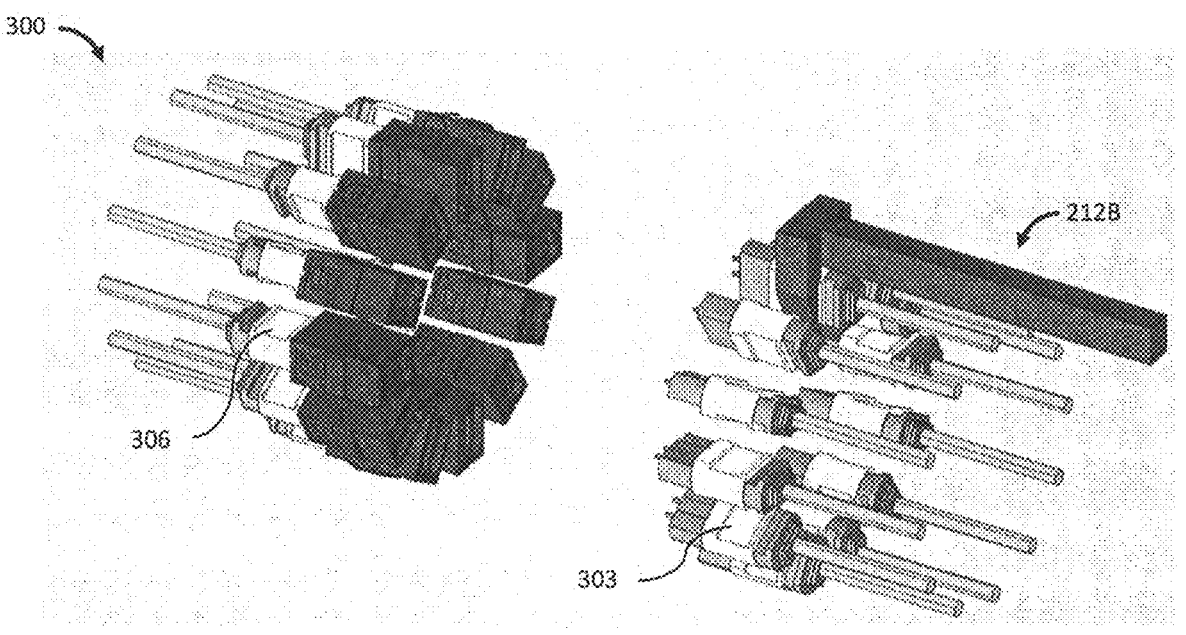

As shown in the example of FIG. 4, optical switch 300 may be substantially the same as optical switch 200B with the exception that output connector assemblies 306 and input connector assemblies 303 may be in the form of mechanical push-on (MPO) connectors as compared to the miniature unit (MU) connectors of optical switch 200B. Use of MPO connectors allows for the use and alignment of up to seventy-two (72) optical fibers received within such connectors for each of the plurality of output connector assemblies 306 and each of the plurality of input connector assemblies 303. Other connector types, e.g., Lucent (LC) and subscriber (SC) connectors, are also possible for the optical switches described herein.

Figure 5:
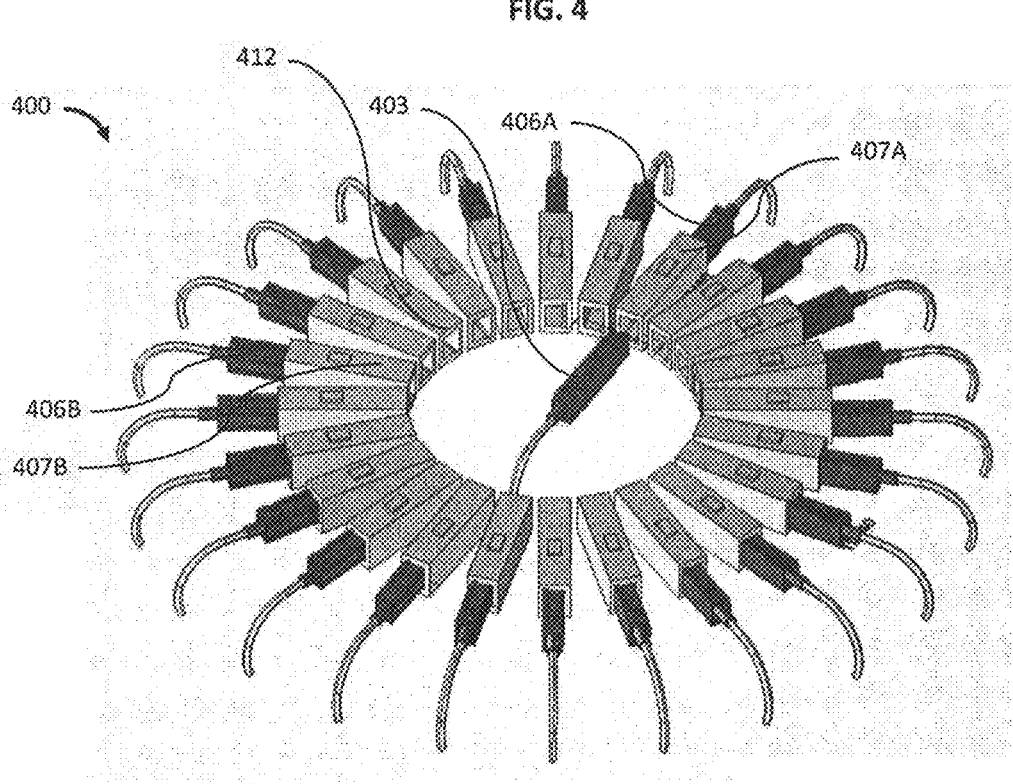

Referring now to FIG. 5, optical switch 400 operates in a similar manner to optical switches 100, 200A, 200B, 300 with the exception that the combinations of the sets of output connector assemblies 406A, 406B and their associated connector adapters 407A, 407B are arranged in a coplanar circular pattern such that ports 412 of the adapters all face toward a center of the sets of the output connector assemblies and adapters. In this example, input connector assembly 403 is rotatable and either one or both of clockwise and counterclockwise directions about a center defined by and within a space defined by ports 412 of adapters 407A, 407B. When input connector assembly 403 is rotated into alignment with desired output connector assembly 406A and not in alignment with any of undesired adapters 407B, an actuation mechanism, e.g., actuation system 108 or actuation system 208, may be activated, e.g., remotely, and operated to translate the input connector assembly to insert the input connector assembly into the desired adapter 407A and into alignment with the desired output connector assembly such that the optical fiber of input connector assembly 403 and an optical fiber of the desired output connector assembly are configured for optical communication.

Figures 6, 7A:
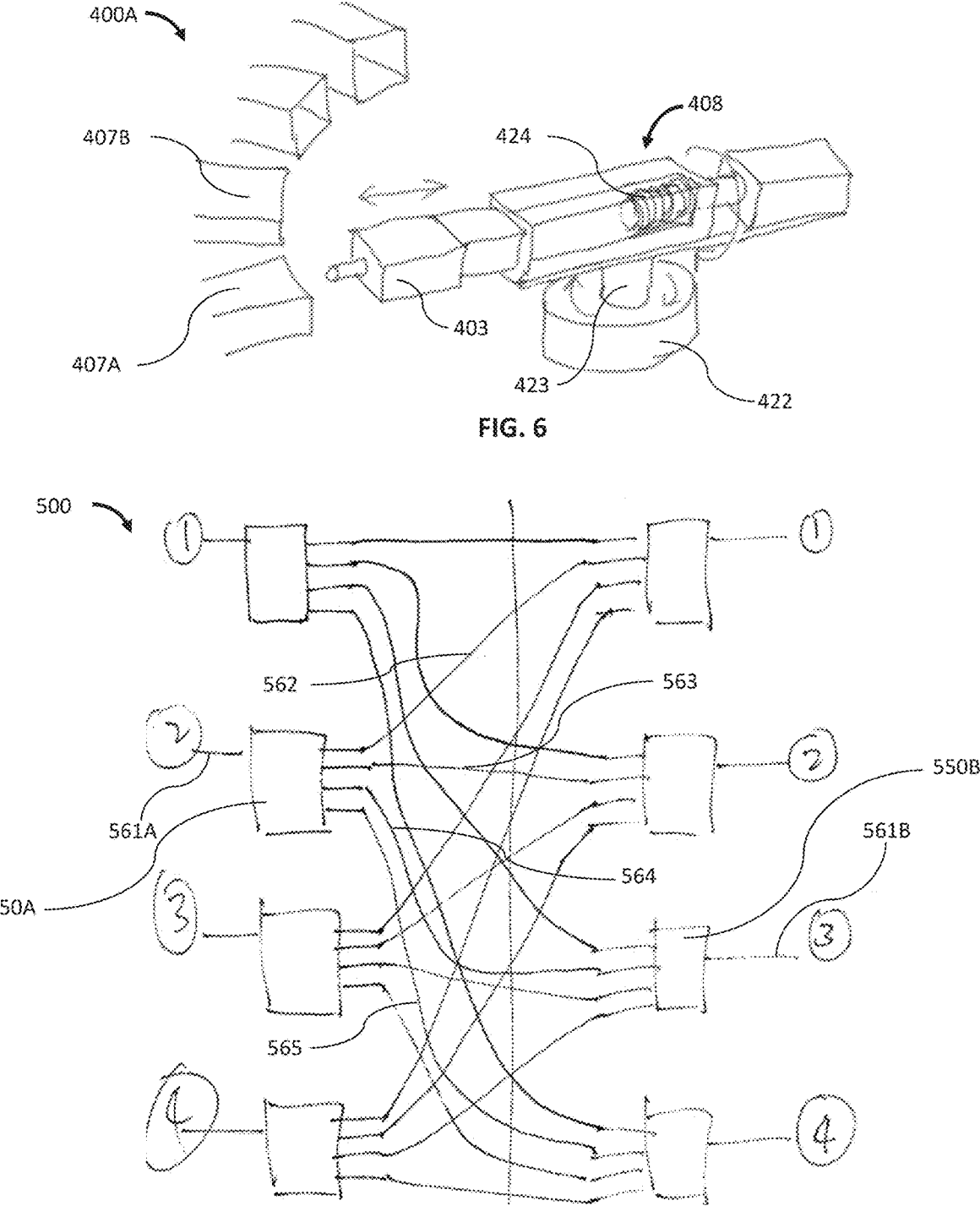
FIG. 7A is a schematic of a N×N optical switch in accordance with an embodiment.

As shown in FIG. 6, in a variation, optical switch 400A includes actuation mechanism 408 that includes base 422, turret 423, and linear actuator 424 which as in the example shown may be screw drive. Turret 423 rotates about and above base 422 in both clockwise and counterclockwise directions to align input connector assembly 403 with desired adapter 407A connected to desired output connector assembly 406A received in the desired adapter. Once in alignment, linear actuator 424 is actuated to insert the input connector of input connector assembly 403 into adapter 407A to align the optical fiber of the input connector assembly with the optical fiber of output connector assembly 406A.

In some arrangements, a plurality of input connector assemblies 403 may be aligned in a circular pattern with the space defined by optical adapters 407A, 407B. The plurality of input connector assemblies 403 may be rotatable such that any one of the input connector assemblies may be aligned with a desired adapter 407A into which a desired output connector assembly 406A may be inserted. When the desired input connector assembly 403 is rotated into alignment with desired output connector assembly 406A and not in alignment with any of undesired adapters 407B, an actuation mechanism, e.g., actuation system 108 or actuation system 208, may be activated, e.g., remotely, and operated to translate the desired input connector assembly to insert such input connector assembly into the desired adapter 406A and into alignment with the desired output connector assembly such that the optical fiber of the desired input connector assembly 403 and an optical fiber of the desired output connector assembly are configured for optical communication.

Figure 7B:
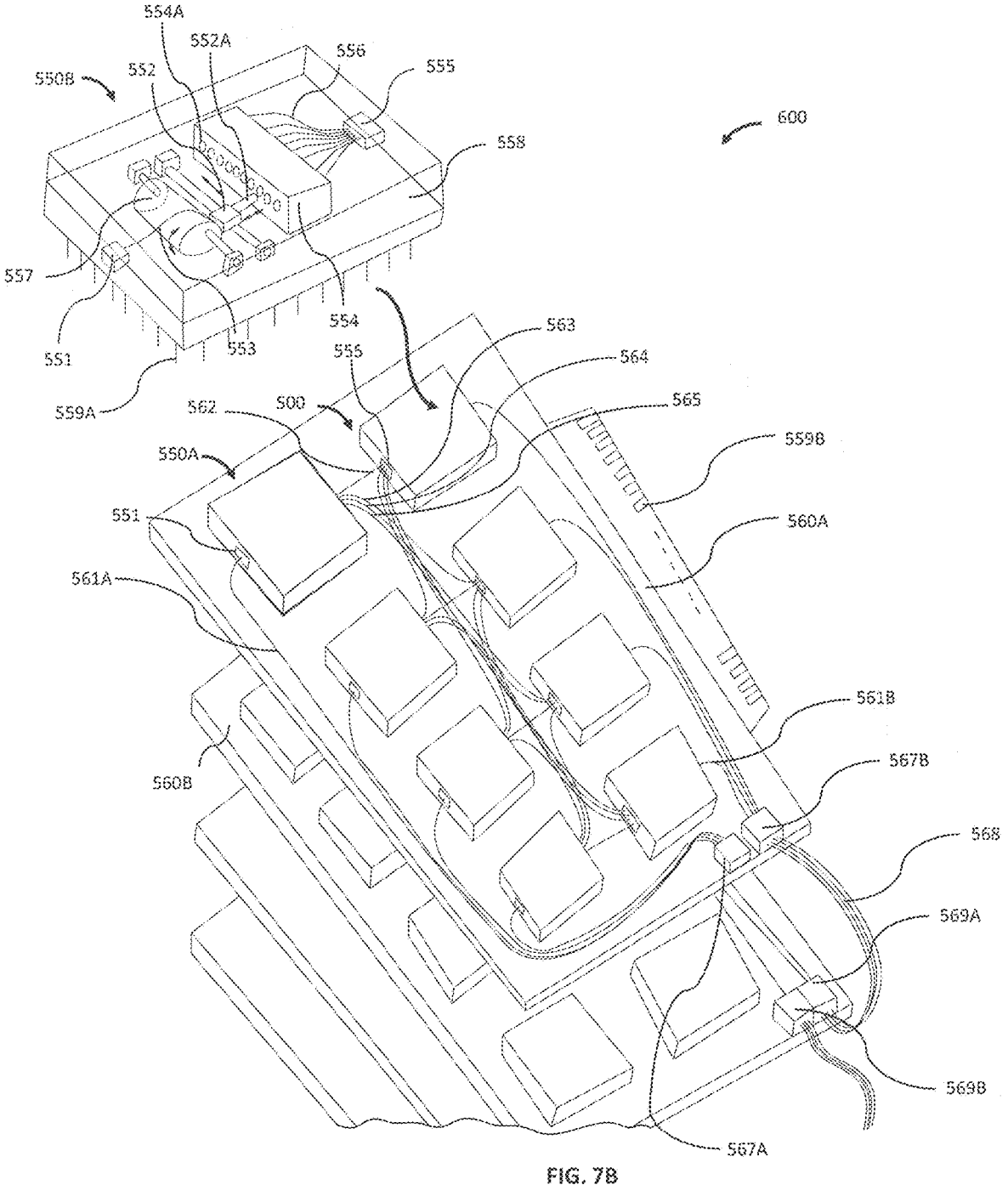
FIG. 7B is a perspective view of an N×M×L optical switch and a perspective view of a 1×N switch module used with the optical switch in accordance with an embodiment.

Referring now to FIGS. 7A and 7B, N×M×L optical switch 600 includes a stack of optical switch cards each formed of N×M optical switches 500 and respective printed circuit boards (PCBs) 560A, 560B in electrical communication with a CPU or CPUs (not shown) via respective electrodes 559B through which components of the optical switches may be powered, although electrical power may be provided separately. In the example shown, optical switches 500 each include eight optical switch modules arranged in a pattern of four switch modules 550A along one side of the optical switch and four switch modules 550B along an opposing side of the optical switch. Optical switch modules 550A are identical to optical switch modules 550B and are merely differentiated here due to their opposite orientations on PCBs 560A, 560B, as shown.

Each optical switch module 550A, 550B includes, on its interior, single fiber port 551, slidable connector assembly 552, first intermediate optical fiber 553 extending between and in optical connection with the single fiber port and the slidable connector assembly, multi-fiber adapter 554 constituting a plurality of port assemblies, multi-fiber port 555, and a plurality of optical fibers 556 extending between respective individual ports of the multi-fiber adapter and the multi-fiber port, and a cam assembly including cam 557 rotatable about a shaft. Connector assembly 552 includes a shaft and an optical connector 552A into which an optical fiber is received in which the optical connector is slidable along the shaft and is configured to be translated and inserted into the respective individual ports 554A of adapter 554. In this manner, optical signals may be conveyed from connector 552A of connector assembly 552 to multi-fiber port 555 via a respective one of the plurality of optical fibers 556. Cam 553 rotates eccentrically to push connector 552A into the desired port 554A of multi-fiber adapter 554. Cam 553 may be rotated and connector assembly 552 including connector 552A may be actuated remotely, such as from an ISP central office to control and manage the operation of the optical signals conveyed from optical switch modules 550A, 550B.

Switch module 550A, 550B includes, on its exterior, cover 558 enclosing the interior of switch module 550A, 550B, which in some arrangements is dust-sealed, in some arrangements to an IP56 rating, and electrical connector pins 559 for attachment to PCBs 560A, 560B and electrical connectivity for the switch module. The CPU, or CPUs, provides an electrical control signal, which may be directed from a remote location by an ISP central office, through respective electrodes 559B to respective switch module 550A, 550B via connector pins 559 to direct rotation of cam 553 and sliding of optical connector 552A. Each of cam 553 and optical connector 552A may provide feedback, e.g., closed loop feedback, to the respective CPU or CPUs to indicate the changed position of the respective one of cam 553 and optical connector 552A. The changed positions of the one or both of cam 553 and optical connector 552A would then be stored in the CPU as current positions such that future adjustments to the one or both of the cam and the optical connector would be based on such current positions.

Optical fibers 561A extend between each one of optical switch modules 550A and switch port 567A to convey optical signals between the respective optical switch modules and the switch port. Likewise, optical fibers 561B extend between each one of optical switch modules 550B and switch port 567B. In this manner, optical signals may be conveyed between switch port 567A and switch port 567B.

In the example shown, optical fiber 562 extends from port 555 of one of switch modules 550A, 550B to a first one of the switch modules of opposing switch modules 550A, 550B, optical fiber 563 extends from port 555 of the one switch module to a second one of the switch modules of the opposing switch modules, optical fiber 564 extends from port 555 of the one of switch module to a third one of the switch modules of the opposing switch modules, and optical fiber 565 extends from port 555 of the one of switch modules to a fourth one of the switch modules of the opposing switch modules. In this manner, optical fibers interconnect each of switch modules 550A to each one of switch modules 550B. By virtue of switch modules 550A, 550B being 1×N optical switches, optical switch 500 is an N×M optical switch.

A plurality of optical fibers 568 extends between switch port 567B of a first optical switch module card forming an optical switch 500 to switch port 569A of a second optical switch module card stacked below the first optical switch module card such that optical signals may be conveyed between switch port 567B and switch port 569B. The second optical switch module card may include a further optical switch module 500 such that optical signals may be conveyed between switch port 569A and a further switch port 569B on the second optical switch module card in the same manner that optical signals are conveyed between switch port 567A and switch port 567B.

Figure 8:
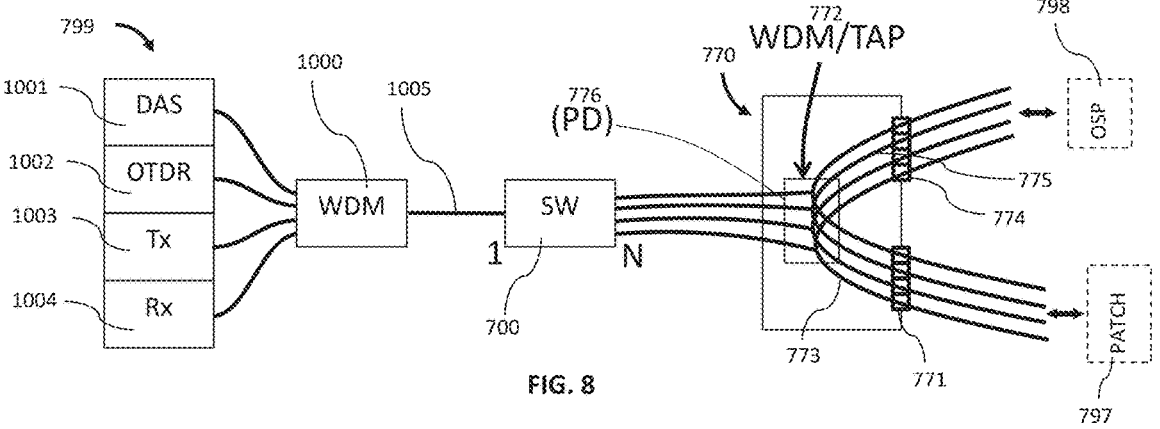
FIGS. 8-11 are schematics of optical systems in accordance with various embodiments.

Referring now to FIG. 8, optical system 799 includes 1×N optical switch 700, optical termination assembly 770 in optical communication with the optical switch, wavelength division multiplexing (WDM) unit 1000, distributed acoustic sensing (DAS) module 1001 in optical communication with the WDM, optical time-domain reflectometer (OTDR) 1002 in optical communication with the WDM, transmitter 1003 in optical communication with the WDM, and receiver 1004 in optical communication with the WDM in which the transmitter and the receiver may be a single transceiver. Transmitter 1003 and receiver 1004 may be used in conjunction, for example, for audit and system maintenance purposes in some arrangements. In some arrangements, optical switch 700 may be or may operate in a similar manner to 1×N optical switch 100, 400, or the 1×N optical switch within switch module 550A, 550B.

Optical termination assembly 770 may include input connectors 771, WDM or tap module 772, a plurality of optical fibers 773 extending between WDM or tap module 772 and respective ones of input connectors 771, output connectors 774, and a plurality of optical fibers 775 extending between the WDM or tap module and the output connectors. The plurality of optical fibers 773 extends from respective ones of the input connectors 771 such that optical fibers 773 convey optical signals to or from respective optical fibers extending between patch panel assembly 797 that, e.g., may be located at a central office, and respective adapters into which such optical fibers and respective opposing ones of optical fibers 773 are received. The plurality of optical fibers 775 are received within respective ones of the output connectors 774 such that optical fibers 775 convey optical signals to and from respective optical fibers extending between outside plant (OSP) enclosure 798, such as may be attached to an office or other building at a customer site, and respective adapters into which such optical fibers and respective ones of optical fibers 775 are received. In this manner, optical signals may be conveyed along optical fibers 773, 775 between OSP enclosure 798 and patch panel assembly 797 via WDM or tap module 772.

In the manner described in International Publication No. WO 2020/113100 filed Nov. 27, 2019, and titled "Intelligent Patch Panel" and U.S. patent application Ser. No. 17/333, 324 filed May 28, 2021, and titled "Intelligent Panel System," the disclosures of both of which hereby being incorporated herein by reference, a portion of each of the optical signals routed from input connectors 771 and output connectors 774 via optical fibers 773, 775 are conveyed to optical switch 700, and in some arrangements also to photodiodes 776 for use in providing electrical signals to a central processing unit (CPU) for use with various functions and data-gathering. In this arrangement, switch 700 may be directed, such as by the CPU which may be in electrical communication with switch 700 as described previously herein with respect to switch modules 550A, 550B and which may be remotely controlled from a central office via a cloud network, to convey optical signals routed from only one of the individual ports of the plurality of input connectors 771 and output connectors 774. WDM unit 1000 then divides optical signals routed from switch 700 along single optical fiber 1005 by wavelength to distribute the optical signals to DAS module 1001, OTDR 1002, transmitting unit 1003, and receiving unit 1004.

It is to be understood that optical signals may be conveyed from DAS module 1001, OTDR 1002, and transmitting unit 1003 to patch panel assembly 797 or OSP enclosure 798 within optical system 799. In some arrangements, the entirety of optical system 799 could be contained within an enclosure, which in some arrangements may be an enclosure accessible by releasing a latch that preferably may be re-latched after accessing the enclosure.

Figure 9:
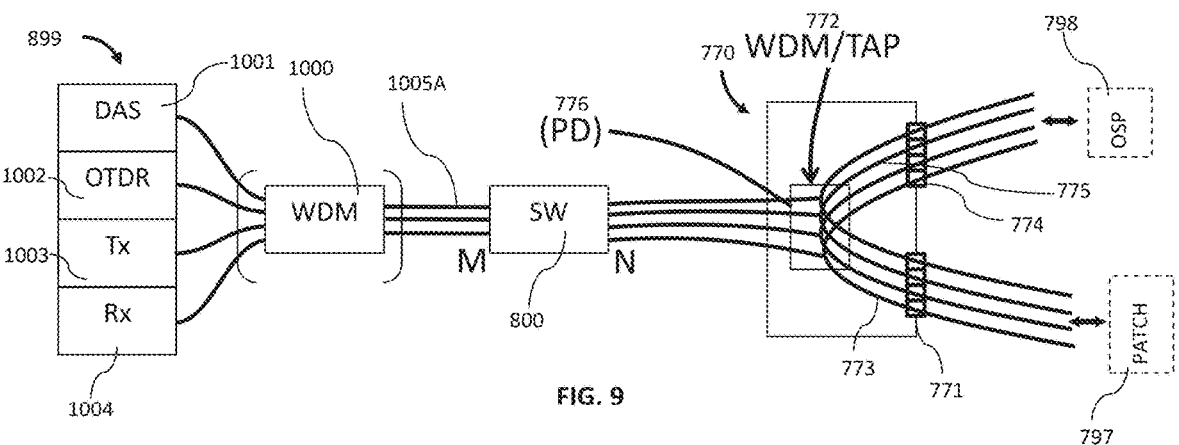

As shown in FIG. 9, optical system 899 is the same as optical system 799 with the exception that optical system 899 includes N×M optical switch 800 in place of 1×N optical switch 700 and a plurality of optical fibers 1005A extending between and routing optical signals between WDM unit 1000 and optical switch 800 in place of single optical fiber 1005. In some arrangements, optical switch 800 may be or may operate in a similar manner to N×M optical switch 200A, 200B, 300, 400 when modified to have a plurality of input connector assemblies, 500, 600, or 1100 described further herein. In this manner, optical switch 800 may selectively, such as when directed remotely, convey optical signals routed from more than one port of the plurality of input connectors 771 or from more than one port of the plurality of output connectors 774, or from both.

As in the arrangement of optical system 799, it is to be understood that optical signals may be conveyed from DAS module 1001, OTDR 1002, and transmitting unit 1003 to patch panel assembly 797 or OSP enclosure 798 within optical system 899. In system 899, due to the multiple optical fibers extending between WDM unit 1000 and optical switch 800, optical signals and thus optical power may be conveyed at the appropriate wavelength, such as from transmitting unit 1003, simultaneously with the optical signals being conveyed from optical termination assembly 770, to compensate for any loss of power from the conveyance of the optical signals from the optical termination assembly such that there may be less of a loss or no less of optical power being conveyed to the intended one or ones of the input connectors 771 or the intended one or ones of the output connectors 774. In some arrangements, the entirety of optical system 899 could be contained within an enclosure, which in some arrangements may be an enclosure accessible by releasing a latch that preferably may be re-latched after accessing the enclosure.

In an alternative arrangement, an optical system may be the same as optical system 899 with the exception that WDM unit 1000 and optical fibers 1005A may be excluded. In such an arrangement, respective optical fibers may extend directly between optical switch 800 and each of DAS module 1001, OTDR 1002, transmitter 1003, and receiver 1004. In this manner, optical switch 800 may be used to select which of DAS module 1001, OTDR 1002, transmitter 1003, and receiver 1004 to connect to a particular connector 771, 774.

Figure 10:
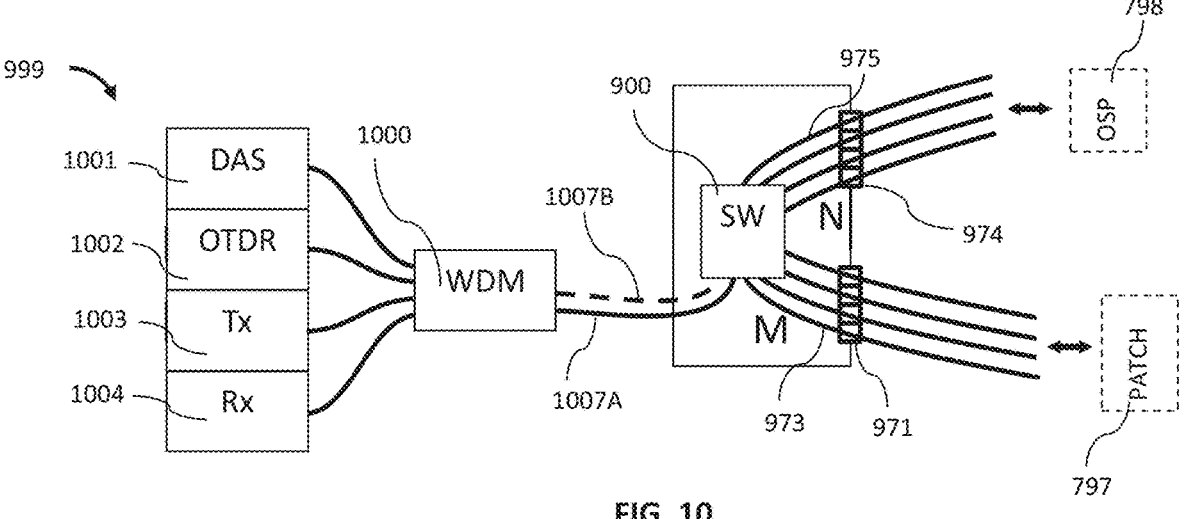

Referring now to FIG. 10, optical system 999 is the same as optical system 799 with the exception that optical system 999 replaces WDM or tap module 772 with N×M optical switch 900 and further includes optical fiber 1007A, and optionally at least one additional optical fiber 1007B, extending between and conveying optical signals between WDM unit 1000 and optical switch 900. Like switch 800, in some arrangements, optical switch 900 may be or may operate in a similar manner to N×M optical switch 200A, 200B, 300, 400 when modified to have a plurality of input connector assemblies, 500, 600, or 1100 described further herein. In this configuration, optical signals conveyed between input connectors 971 and output connectors 974 are routed via optical switch 900 and, when directed by the CPU which may be remotely controlled by an ISP central office, are routed via the optical switch to WDM unit 1000. In this arrangement, optical switch 900, when directed by the CPU, switches optical signals being conveyed, along one of optical fibers 973, from a connector of the set of input connectors 971 to a connector of the set of output connectors 974, along one of optical fibers 975, to being conveyed, along another one of optical fibers 975, to another one of the connectors of the set of output connectors or switches optical signals being conveyed, along one of optical fibers 975, from a connector of the set of output connectors 974 to a connector of the set of input connectors 971, along one of optical fibers 973, to being conveyed, along another one of optical fibers 975, to another one of the connectors of the set of input connectors. By eliminating WDM or tap module 772, optical system 999 requires fewer components than optical systems 799, 899. However, optical signals are routed with their full power when such signals are directed to be conveyed to WDM unit 1000 unlike optical signals routed to WDM unit 1000 in the examples of optical system 799 and optical system 899.

As in the arrangements of optical systems 799, 899, it is to be understood that optical signals may be conveyed from DAS module 1001, OTDR 1002, and transmitting unit 1003 to patch panel assembly 797 or OSP enclosure 798 within optical system 999. In system 999, when additional optical fiber 1007B is employed between WDM unit 1000 and optical switch 900, optical signals and thus optical power may be conveyed at the appropriate wavelength, such as from transmitting unit 1003, simultaneously with the optical signals being conveyed from optical switch 900 to WDM unit 1000, to compensate for any loss of power from the conveyance of the optical signals from the optical switch such that there may be less of a loss or no loss of optical power being conveyed to the intended one or ones of the input connectors 971 or the intended one or ones of the output connectors 974. In some arrangements, the entirety of optical system 999 could be contained within an enclosure, which in some arrangements may be an enclosure accessible by releasing a latch that preferably may be re-latched after accessing the enclosure.

Figure 11:
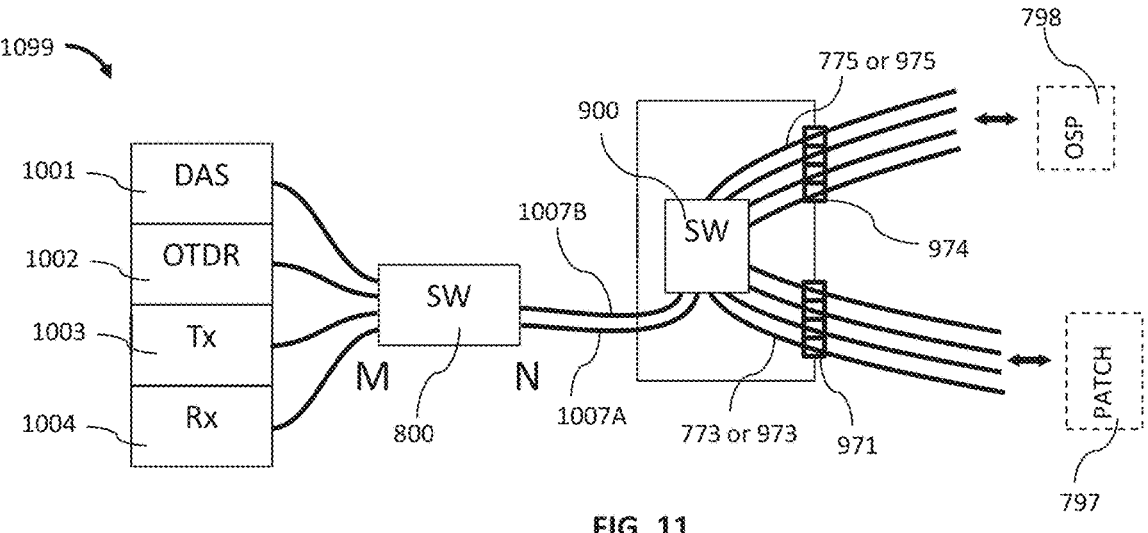

Referring now to FIG. 11, optical system 1099 is the same as optical system 999 with the exception that optical system 1099 replaces WDM unit 1000 with N×M optical switch 800. In a similar manner as in the alternative arrangement of optical system 899 described previously herein, optical switch 800 may be used to select which of DAS module 1001, OTDR 1002, transmitter 1003, and receiver 1004 to connect to a particular connector 971, 974.

Figure 12:
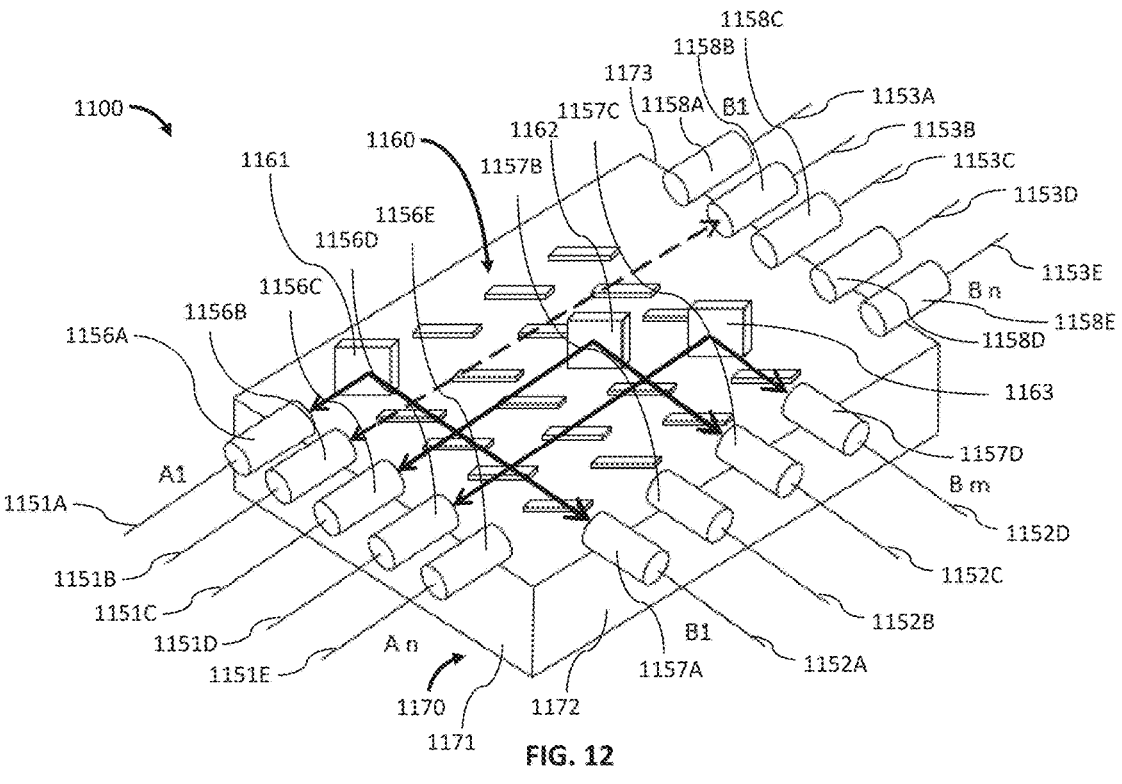
FIG. 12 is a perspective view of an N×M optical switch in accordance with an embodiment.

Referring now to FIG. 12, N×M optical switch 1100 includes optical fibers 1151A-1151E, 1152A-1152D, 1153A-1153E, fiber optic collimators 1156A-1156E, 1157A-1157D, 1158A-1158E, and array 1160 of mirrors to convey light between pairs of optical fibers via associated ones of the collimators and mirrors of the array. In this example, optical switch 1100 further includes optical housing 1170 in which array 1160 of mirrors are receivable within and extendable from a bottom surface of the housing and in which collimators 1156A-1156E, 1157A-1157D, 1158A-1158E, extend into and are held in position by respective attached sides 1171-1173 of the housing. Sides 1171-1173 along with side 1174 of housing 1170 may form a box configuration, as shown, in which the housing may be covered (not shown). Each mirror of array 1160 is movable, for example by a mechanical or electromechanical actuation system, between a raised position, as shown by each of mirrors 1161-1163, and a lowered position as shown by the remainder of the array of mirrors. As shown, optical fibers 1151A-1151E, 1152A-1152D, 1153A-1153E may be directly attached to respective ones of fiber optic collimators 1156A-1156E, 1157A-1157D, 1158A-1158E or may be indirectly attached and thereby more easily separable from the respective ones of the fiber optic collimators via a fiber connector, e.g., of FC or SMA type. In this manner, light conveyed by optical fibers 1151A-1151E, 1152A-1152D, 1153A-1153E is collimated by respective ones of collimators 1156A-1156E, 1157A-1157D, 1158A-1158E.

In this example, corresponding optical fibers 1151A-1151E, collimators 1156A-1156E, columns of mirrors of array 1160, collimators 1158A-1158E, and optical fibers 1153A-1153E are in alignment such that when a respective complete column of mirrors are in the lowered position, light conveyed by optical fibers 1151A-1151E is routed to corresponding ones of optical fibers 1153A-1153E and, similarly, light conveyed by optical fibers 1153A-1153E is routed to corresponding ones of optical fibers 1151A-1151E. For instance, in the configuration shown, the second and fifth columns of mirrors of array 1160 are in the lowered position such that light conveyed by optical fiber 1151B is received by optical fiber 1153B, light conveyed by optical fiber 1153B is received by optical fiber 1151B, light conveyed by optical fiber 1151E is received by optical fiber 1153E, and light conveyed by optical fiber 1153E is received by optical fiber 1151E.

As further shown, each mirror of array 1160 is set such that a reflecting surface of the mirror is at a forty-five degree angle, i.e., 45°, to axes of respective ones of collimated light beams conveyed by collimators 1156A-1156E and to axes of respective ones of collimated light beams conveyed by collimators 1157A-1157D. In this manner, when a mirror of array 1160 is in the raised position, a collimated light beam conveyed by a corresponding one of collimators 1156A-1156E is reflected by the raised mirror and routed by such mirror to a corresponding one of collimators 1157A-1157D and, similarly, a collimated light beam conveyed by a corresponding one of collimators 1157A-1157D is reflected by the raised mirror and routed by such mirror to a corresponding one of collimators 1156A-1156E. For instance, in the configuration shown, mirrors 1161-1163 are in the raised position such that light conveyed by optical fiber 1151A is routed by mirror 1161 and collimator 1157A to optical fiber 1152A, light conveyed by optical fiber 1151C is routed by mirror 1162 and collimator 1157C to optical fiber 1152C, and light conveyed by optical fiber 1151D is routed by mirror 1163 and collimator 1157D to optical fiber 1152D.

In some arrangements, there may be more or less collimators along sides 1171-1173 of housing 1170 than are shown in the example of optical switch 1100. In such arrangements, there may be n collimators along each of sides 1171, 1173 and either n or m collimators alongside 1172 of housing 1170. In some such arrangements, n may equal 12, 24, or some other value and m may equal a different value than n.

In some arrangements, a column or row of mirrors of the array of mirrors, such as array 1160, may include a plurality of mirrors in the raised position. In such arrangements, only the mirror of such plurality of mirrors that may reflect a collimated light beam without interference from the other mirror would be available to route a collimated light between associated collimators. In configurations utilizing a plurality of mirrors, the mirrors may be mechanically joined such that the mirrors operate in tandem. Such joinder may allow the use of fewer components within a switch by avoiding the need for a separate actuation system to be attached or otherwise associated with each mirror.

Figure 13:
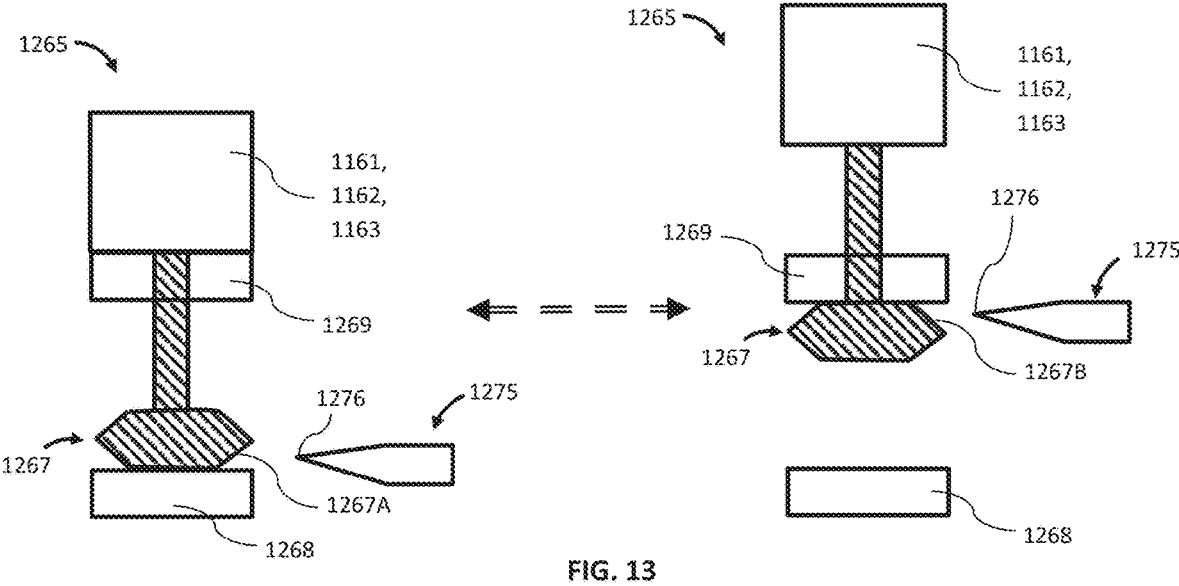
FIG. 13 is a cross-sectional elevational view of a mirror actuation assembly.

Referring now to FIG. 13, any one or combination of the mirrors of array 1160, including mirrors 1161, 1162, 1163, may be part of mirror assembly 1265. As shown, besides the mirrors, mirror assembly 1265 includes mirror support 1266, movable catch 1267, first or lower fixation structure 1268, and second or upper fixation structure 1269, and probe 1275. Mirror support 1266 extends between and is attached to both the mirror of array 1160 and movable catch 1267 such that the mirror, the mirror support, and the movable catch move in tandem between a lowered position state of mirror assembly 1265, in which the mirror is in the lowered position and the movable catch is in contact with and thereby prevented from further downward movement by lower fixation structure 1268, and a raised position state of the mirror assembly, in which the mirror is in the raised position and the movable catch is in contact with and thereby prevented from further upward movement by upper fixation structure 1269. In this manner, mirror assembly 1265 may be a mechanically bistable structure having only two stable states. In some arrangements, mirror support 1266 may be integral with either one or both of the mirror of array 1160 and movable catch 1267 such that the mirror support is inseparable from the one or both of the mirror and the movable catch.

As shown in the example of FIG. 13, mirror support 1266 may be in the form of a post, and movable catch 1267 may be in the form of a base. Movable catch 1267 has lower and upper tapered surfaces 1267A, 1265B such that the lower tapered surface of the catch and an upper surface of lower fixation structure 1268 define a lower opening in the lowered position state of mirror assembly 1265 while the upper tapered surface of the catch and a lower surface of upper fixation structure 1269 define an upper opening in the raised position state of the mirror assembly.

As further shown, probe 1275 may be in the form of a wedge vertically movable such that a tip 1276 of the probe may be in a lowered state of alignment in which the probe is aligned with the lower opening defined by movable catch 1267 and lower fixation structure 1268 when mirror assembly 1265 is in the lowered position state and may be in a raised state of alignment in which the probe is aligned with the upper opening defined by movable catch 1267 and upper fixation structure 1269 when the mirror assembly is in the raised position state. When probe 1275 is in the lowered state of alignment, the probe may be inserted into the defined lower opening and thereby contact lower tapered surface 1267A of movable catch 1267 to cause the movable catch to separate from contact with lower fixation structure 1268, and when the probe is in the raised state of alignment, the probe may be inserted into the defined upper opening and thereby contact upper tapered surface 1267B of the movable catch to cause the movable catch to separate from contact with upper fixation structure 1269. Probe 1275 may be part of an actuation system such that the location of the probe may be controlled, e.g., via a wireless or electrical connection, by a controller external to the optical switch, e.g., optical switch 1100.

In one example, lower and upper fixation structures 1268, 1269 may be permanent magnets while movable catch 1267 may be made of a magnetizable material, e.g., steel such that the movable catch may be held against either the lower fixation structure or the upper fixation structure, while in an alternative example, the lower and the upper fixation structures may be made of a magnetizable material, e.g., steel, while the movable catch may be a permanent magnet such that the movable catch may be held against either the lower fixation structure or the upper fixation structure. In either of these magnetic component configurations, when probe 1275 is inserted into the lower opening defined by movable catch 1267 and lower fixation structure 1268, the contact of the probe with each of the movable catch and the lower fixation structure is sufficient to overcome the magnetizing force holding the movable catch against the lower fixation structure, and, furthermore, the probe has a thickness (measured vertically) such that the movable catch is more attracted to upper fixation structure 1269 than to the lower fixation structure and thereby moves towards the upper fixation structure to be held against the upper fixation structure. Likewise, in either of these magnetic component configurations, when probe 1275 is inserted into the upper opening defined by movable catch 1267 and upper fixation structure 1269, the contact of the probe with each of the movable catch and the upper fixation structure is sufficient to overcome the magnetizing force holding the movable catch against the upper fixation structure, and, furthermore, the probe has a thickness (measured vertically) such that the movable catch is more attracted to lower fixation structure 1268 than to the upper fixation structure and thereby moves towards the lower fixation structure to be held against the lower fixation structure.

In another example, movable catch 1267 may not be magnetizable to lower and upper fixation structures 1268, 1269. Instead, movable catch 1267 and probe 1275 may have a combined thickness such that when the probe is inserted into the lower opening defined by the movable catch and lower fixation structure 1268, the movable catch is pushed upward toward upper fixation structure 1269 and becomes removably attached to the upper fixation structure to hold the movable catch against the upper fixation structure and such that when the probe is inserted into the upper opening defined by the movable catch and upper fixation structure 1269, the movable catch is pushed downward toward lower fixation structure 1268 and becomes removably attached to the lower fixation structure to hold the movable catch against the lower fixation structure. In some arrangements, movable catch 1267 may be attached to upper and lower fixation structures 1268, 1269 by snapping the catch to the fixation structure, by an interference fit between the attached catch and fixation structure, or by other mechanical attachment means known to those skilled in the art.

In some alternative arrangements, lower and upper fixation structures 1268, 1269 may be electromagnetic assemblies such that an electrical current may be applied to create a magnetic field about a magnetic core and thereby attract movable catch 1267 to either the lower fixation structure or the upper fixation structure. Such electrical current may be controller by a controller external to optical switch 1100. In these types of arrangements, probe 1275 may not be needed.

It is to be further understood that the disclosure set forth herein includes any possible combinations of the particular features set forth above, whether specifically disclosed herein or not. For example, where a particular feature is disclosed in the context of a particular aspect, arrangement, configuration, or embodiment, that feature can also be used, to the extent possible, in combination with and/or in the context of other particular aspects, arrangements, configurations, and embodiments of the technology, and in the technology generally.

Furthermore, although the technology herein has been described with reference to particular features, it is to be understood that these features are merely illustrative of the principles and applications of the present technology. It is therefore to be understood that numerous modifications, including changes in the sizes of the various features described herein, may be made to the illustrative embodiments and that other arrangements may be devised without departing from the spirit and scope of the present technology. In this regard, the present technology encompasses numerous additional features in addition to those specific features set forth in the claims below. Moreover, the foregoing disclosure should be taken by way of illustration rather than by way of limitation as the present technology is defined by the claims set forth below.

The invention claimed is:

1. An optical system comprising:
a plurality of first connectors configured for conveying optical signals;
a plurality of second connectors configured for conveying optical signals;
a first optical switch configured for conveying optical signals conveyed from one or both of the plurality of first connectors and the plurality of second connectors; and
a first component,
wherein the first optical switch is configured for selectively passing optical signals conveyed from the one or both of the plurality of first connectors and the plurality of second connectors to the first component.

2. The optical system of claim 1, further comprising an optical filter, wherein the first optical switch is configured for receiving optical signals conveyed from the one or both of the plurality of first connectors and the plurality of second connectors from the optical filter.

3. The optical system of claim 2, wherein the optical filter is a wavelength division multiplexing (WDM) or optical tap module.

4. The optical system of claim 1, further comprising:
an optical splitter or a second optical switch configured for conveying optical signals, the first component being in optical communication with one of the optical splitter and the second optical switch; and
a second component in optical communication with the one of the optical splitter and the second optical switch, wherein optical signals received by the one of the optical splitter and the second optical switch are i) filtered into a first portion conveyed to the first component and a second portion conveyed to the second component when the optical system comprises the optical splitter and ii) conveyed to either the first component or the second component when the optical system comprises the second optical switch.

5. The optical system of claim 4, wherein the optical splitter is a wavelength division multiplexing (WDM) unit.

6. The optical system of claim 4, wherein the first optical switch is configured to convey optical signals conveyed from only one of the plurality of first connectors to the optical splitter or from only one of the plurality of second connectors to the optical splitter.

7. The optical system of claim 4, wherein the first optical switch is configured to convey optical signals conveyed from more than one of the plurality of first connectors and the plurality of second connectors to the optical splitter.

8. The optical system of claim 7, wherein the optical splitter is configured for conveying optical signals conveyed from only one of the plurality of first connectors or from only one of the plurality of second connectors to the first component or to the second component.

9. The optical system of claim 7, further comprising first optical fibers extending between the first optical switch and the plurality of first connectors and second optical fibers extending between the first optical switch and the plurality of second connectors.

10. The optical system of claim 4, wherein each of the first component and the second component is a distributed acoustic sensing (DAS) module, an optical time-domain reflectometer (OTDR), an optical transmitter, or an optical receiver and the second component, and wherein the first component is different than the second component.

11. The optical system of claim 1, wherein the first optical switch is configured for switching optical signals being conveyed from a first connector of the plurality of first connectors to a second connector of the plurality of second connectors to being conveyed from the first connector to a third connector of the plurality of second connectors.

12. An optical system comprising:
a first connector configured for conveying optical signals;
a second connector configured for conveying optical signals;
a first optical switch configured for conveying optical signals conveyed from one or both of the first connector and the second connector;
one of an optical splitter or a second optical switch configured for conveying optical signals;
a first component in optical communication with the one of the optical splitter or the second optical switch; and
a second component in optical communication with the one of the optical splitter or the second optical switch,
wherein the first optical switch is configured for selectively passing optical signals conveyed from the one or both of the first connector and the second connector to the one of the optical splitter or the second optical switch, and
wherein optical signals received by the one of the optical splitter or the second optical switch are i) filtered into a first portion conveyed to the first component and a second portion conveyed to the second component when the optical system comprises the optical splitter and ii) conveyed to either the first component or the second component when the optical system comprises the second optical switch.

13. The optical system of claim 12, further comprising an optical filter, wherein the first optical switch is configured for receiving optical signals conveyed from the one or both of the first connector and the second connector from the optical filter.

14. The optical system of claim 13, wherein the optical filter is a wavelength division multiplexing (WDM) or optical tap module.

15. The optical system of claim 12, wherein the optical splitter is a wavelength division multiplexing (WDM) unit.

* * * * *